(12) United States Patent
Zhu et al.

(10) Patent No.: US 12,002,960 B2
(45) Date of Patent: *Jun. 4, 2024

(54) BATTERY PACK AND ELECTRIC DEVICE

(71) Applicant: CONTEMPORARY AMPEREX TECHNOLOGY CO., LIMITED, Fujian (CN)

(72) Inventors: Chang Zhu, Fujian (CN); Shaocong Ouyang, Fujian (CN); Baoyun Xu, Fujian (CN); Tingzhen Xie, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/383,542

(22) Filed: Oct. 25, 2023

(65) Prior Publication Data

US 2024/0055610 A1     Feb. 15, 2024

Related U.S. Application Data

(63) Continuation of application No. PCT/CN2022/096790, filed on Jun. 2, 2022.

(51) Int. Cl.
*H01M 4/62*     (2006.01)
*H01M 50/204*     (2021.01)
(Continued)

(52) U.S. Cl.
CPC ........... *H01M 4/62* (2013.01); *H01M 50/204* (2021.01); *H01M 50/267* (2021.01); *H01M 2004/028* (2013.01)

(58) Field of Classification Search
CPC ..... H01M 4/62; H01M 50/204; H01M 50/267
See application file for complete search history.

(56) References Cited

U.S. PATENT DOCUMENTS

| 2019/0044145 A1* | 2/2019 | Lambert | H01M 4/38 |
| 2021/0194079 A1* | 6/2021 | Bi | H01M 4/368 |
| 2022/0115686 A1* | 4/2022 | Liu | H01M 16/00 |

FOREIGN PATENT DOCUMENTS

| CN | 101478042 A | 7/2009 |
| CN | 101834311 A | 9/2010 |

(Continued)

OTHER PUBLICATIONS

International Search Report and Written Opinion mailed on Feb. 27, 2023, received for PCT Application PCT/CN2022/096790, filed on Jun. 2, 2022, 18 pages including English Translation.

*Primary Examiner* — Jonathan G Jelsma
(74) *Attorney, Agent, or Firm* — XSENSUS LLP

(57) ABSTRACT

A battery pack and an electric device including the battery pack. The battery pack includes a battery pack container and first, second and third battery cells accommodated in different regions of the battery pack container, the first, second and third battery cells each has a first and a second discharge voltage plateau, an average discharge voltage of the first discharge voltage plateau is higher than an average discharge voltage of the second discharge voltage plateau, and the first, second and third battery cells have different proportions of the discharge capacity corresponding to the second discharge voltage plateau.

20 Claims, 2 Drawing Sheets

(51) Int. Cl.
*H01M 50/267* (2021.01)
*H01M 4/02* (2006.01)

(56) References Cited

FOREIGN PATENT DOCUMENTS

| | | | |
|---|---|---|---|
| CN | 105428734 A | 3/2016 | |
| CN | 113594636 A | 11/2021 | |
| CN | 114096486 A | 2/2022 | |
| CN | 114142108 A | 3/2022 | |
| CN | 114361561 A | 4/2022 | |
| JP | 2013-065453 A | 4/2013 | |
| WO | WO-2022136770 A1 * | 6/2022 | ........ H01M 10/0525 |

* cited by examiner

BATTERY PACK AND ELECTRIC DEVICE

CROSS-REFERENCE TO RELATED APPLICATION

The present application is a continuation of International Application No. PCT/CN2022/096790, filed Jun. 2, 2022, which is incorporated herein by reference in its entirety.

TECHNICAL FIELD

The present application relates to the technical field of lithium-ion batteries, and in particular, to a battery pack having a high energy retention rate at low temperatures and an electric device including the battery pack.

BACKGROUND

With the continuous development of lithium-ion battery technology in recent years, lithium-ion batteries have been widely used in energy storage power systems such as hydro, thermal, wind and solar power stations, as well as in a variety of fields such as electrical tools, electric bicycles, electric motorcycles, electric vehicles, military equipment, aerospace and so on.

In the above fields, the capacity of a lithium-ion secondary battery cell is sometimes unable to meet the demand for use, and at this time it is necessary to connect a plurality of lithium-ion secondary battery cells in series or in parallel to form a battery pack in order to improve the overall discharge capacity of the battery pack.

However, when the battery pack consisting of lithium-ion secondary battery cells is used in a low-temperature environment like winter, the energy retention rate decreases dramatically, i.e., the battery life at low temperatures is significantly reduced, and there is an urgent demand for improving the battery life of the battery pack as a whole at low temperatures.

SUMMARY

In view of the above problems, an objective of the present application is to provide a battery pack including a lithium-ion secondary battery having an excellent energy retention rate at low temperatures and an improved battery life at low temperatures, and an electric device including the battery pack In order to achieve the above objective, a first aspect of the present application provides a battery pack including a battery pack container and battery cells accommodated in the battery pack container, an interior space of the battery pack container includes a first region, a second region and a third region, first battery cells are arranged in the first region, second battery cells are arranged in the second region, third battery cells are arranged in the third region, the second battery cells are arranged surrounding the first battery cells, the third battery cells are arranged surrounding the second battery cells, the first battery cells, the second battery cells and the third battery cells each has a first discharge voltage plateau and a second discharge voltage plateau, an average discharge voltage of the first discharge voltage plateau is higher than an average discharge voltage of the second discharge voltage plateau, a cathode active substance of each of the first battery cells, the second battery cells and the third battery cells is a mixture of a first cathode active substance having the first discharge voltage plateau and a cathode functional additive having the second discharge voltage plateau, and the cathode functional additive is a titanium oxide, a niobium oxide or a titanium-niobium oxide, and for each of the first battery cells, the second battery cells and the third battery cells, when a sum of the discharge capacity corresponding to the first discharge voltage plateau and the discharge capacity corresponding to the second discharge voltage plateau is 100%, a proportion of the discharge capacity corresponding to the second discharge voltage plateau in the third battery cells>a proportion of the discharge capacity corresponding to the second discharge voltage plateau in the second battery cells>a proportion of the discharge capacity corresponding to the second discharge voltage plateau in the first battery cells.

Therefore, the present application improves the overall energy retention rate of the battery pack at low temperatures by arranging battery cells with different discharge capacities at low temperatures according to the temperature distribution inside the battery pack. Specifically, battery cells with different low-temperature energy retention rates having dual discharge voltage plateaus (a first discharge voltage plateau with a higher discharge voltage and a second discharge voltage plateau with a lower discharge voltage) are respectively configured in regions with different temperatures in the interior space of the battery pack container, and battery cells with a higher low-temperature energy retention rate are arranged in regions with a lower temperature. By arranging battery cells with relatively low low-temperature performance (relatively small low-temperature energy retention rate) in regions with relatively high temperatures in the interior space of the battery pack container, and arranging battery cells with relatively high low-temperature performance (relatively large low-temperature energy retention rate) in regions with relatively low temperatures in the interior space of the battery pack container, the consistency of cycling of the battery cells in the various regions with different temperatures in the battery pack can be higher, which improves the overall low-temperature energy retention rate of the battery pack, thus improving the overall low-temperature battery life of the battery pack.

The cathode active substance of the battery cells with dual discharge voltage plateau in the present application is prepared by mixing a conventional cathode active substance (the first cathode active substance) and a cathode functional additive, the conventional cathode active substance has a first discharge voltage plateau with a higher discharge voltage, and the cathode functional additive is a titanium oxide, a niobium oxide or a titanium-niobium oxide, and these cathode functional additives have a second discharge voltage plateau with a lower discharge voltage. The discharge capacity of the second discharge voltage plateau with the lower discharge voltage in the battery cells may be adjusted by adjusting the content of the cathode functional additive in the cathode active substance. By using the battery cell having a dual discharge voltage plateau, it is possible to continue to discharge the battery cells utilizing the second discharge voltage plateau which has the lower discharge voltage after discharging the battery cells utilizing the first discharge voltage plateau which has the higher discharge voltage, this significantly improves the discharge power of the battery cells, especially the discharge power under a low-temperature condition, so as to enable the battery cells to have a higher low-temperature energy retention rate.

The shape of the battery pack of the present application is arbitrary and may be any shape designed according to customer requirements.

In the battery pack of the present application, the interior space of the battery pack container is not limited to being divided into the above-described three regions, as long as it includes the above-described first region, second region and third region. Specifically, the interior space of the battery pack container may consist of the above-mentioned first region, the second region and the third region; the interior space of the battery pack container may also, in addition to the above-mentioned first region, the second region and the third region, include one or more regions on an outer side of the third region, as long as the battery cells arranged in the outer region enclose the battery cells arranged in the inner region of the interior space.

In the case where the interior space of the battery pack container includes at least the three regions as described above, the battery pack of the present application satisfies that the proportion of the discharge capacity corresponding to the second discharge voltage plateau in the battery cells in regions toward the outer side is higher (i.e., the mass percentage of the cathode functional additive in the cathode active substance of these battery cells is higher).

In some embodiments, in a case where the interior space of the battery pack container has a rectangular shape, four corners of the rectangular shape may be considered as outermost regions in which the proportion of the discharge capacity corresponding to the second discharge voltage plateau in the battery cells is the highest (i.e., the mass percentage of the cathode functional additive in the cathode active substance of these battery cells is highest).

In some embodiments, the interior space of the battery pack container consists of the first region, the second region and the third region.

Accordingly, it is possible to obtain the excellent effect described above in the battery pack in which the interior space thereof is divided into the above-mentioned three regions, namely, the first region, the second region, and the third region.

In some embodiments, the cathode functional additive is a titanium niobium oxide represented by $Ti_2Nb_{2x}O_{4+5x}$, where x is an integer of 1 or higher, and optionally, the titanium niobium oxide is one or more selected from $Ti_2Nb_2O_9$, $TiNb_2O_7$, $Ti_2Nb_{10}O_{29}$ and $TiNb_{24}O_{62}$.

Accordingly, by selecting a titanium niobium oxide with excellent performance as a functional additive for the cathode, it is possible to obtain a battery cell with a suitable second discharge voltage plateau, and thus it is possible to realize the battery pack of the present application which has excellent low-temperature performances.

In some embodiments, the second discharge voltage plateau has a discharge voltage in a range of 1.0 V-2.0 V, optionally, a discharge capacity of the second discharge voltage plateau in a range of 1.2 V-1.6 V accounts for more than 50%, optionally more than 70%, of the total discharge capacity of the second discharge voltage plateau.

Accordingly, by configuring the discharge voltage of the second discharge voltage plateau within the above range, it is possible to remarkably distinguish the discharge voltage of the second discharge voltage plateau from the discharge voltage of the first discharge voltage plateau, so as to achieve the above significant effect resulting from a dual discharge voltage plateau. With the proportion of the discharge capacity of the second discharge voltage plateau at 1.2 V-1.6 V to the total discharge capacity of the second discharge voltage plateau within the above-mentioned range, it is possible to ensure that the battery cells are able to release sufficient energy at low temperatures, and thereby ensure the overall low-temperature energy retention rate of the battery pack.

In some embodiments, in the first, second, and third battery cells, a difference between a lowest discharge voltage of the first discharge voltage plateau and a highest discharge voltage of the second discharge voltage plateau is 0.5 V or higher, optionally 1.0 V or higher.

Accordingly, after discharging at the first discharge voltage plateau with a higher discharge voltage, it is possible to continue discharging at the second discharge voltage plateau with a lower discharge voltage, which can significantly increase the energy released by each battery cell at low temperatures, thereby improving the overall energy retention rate of the battery pack at low temperatures.

In some embodiments, in the first battery cells, when the sum of the discharge capacity corresponding to the first discharge voltage plateau and the discharge capacity corresponding to the second discharge voltage plateau is 100%, the discharge capacity corresponding to the first discharge voltage plateau accounts for 90%-100%, and the discharge capacity corresponding to the second discharge voltage plateau accounts for 0%-10%.

Accordingly, by configuring the respective proportions of the discharge capacity corresponding to the first discharge voltage plateau and the discharge capacity corresponding to the second discharge voltage plateau in the first battery cells within the above-mentioned ranges, it is possible to increase the amount of energy released by the first battery cells at low temperatures, and thereby improving the overall low-temperature energy retention rate of the battery pack.

In some embodiments, in the second battery cells, when the sum of the discharge capacity corresponding to the first discharge voltage plateau and the discharge capacity corresponding to the second discharge voltage plateau is 100%, the discharge capacity corresponding to the first discharge voltage plateau accounts for 73%-95%, and the discharge capacity corresponding to the second discharge voltage plateau accounts for 5%-27%.

Accordingly, by configuring the respective proportions of the discharge capacity corresponding to the first discharge voltage plateau and the discharge capacity corresponding to the second discharge voltage plateau in the second battery cells within the above-mentioned ranges, it is possible to increase the amount of energy released by the second battery cells at low temperatures, and thereby improving the overall low-temperature energy retention rate of the battery pack.

In some embodiments, in the third battery cells, when the sum of the discharge capacity corresponding to the first discharge voltage plateau and the discharge capacity corresponding to the second discharge voltage plateau is 100%, the discharge capacity corresponding to the first discharge voltage plateau accounts for 54%-87%, and the discharge capacity corresponding to the second discharge voltage plateau accounts for 13%-46%.

Accordingly, by configuring the respective proportions of the discharge capacity corresponding to the first discharge voltage plateau and the discharge capacity corresponding to the second discharge voltage plateau in the third battery cells within the above-mentioned ranges, it is possible to increase the amount of energy released by the third battery cells at low temperatures, and thereby improving the overall low-temperature energy retention rate of the battery pack.

In some embodiments, the cathode active substance of the first battery cells has a specific capacity of 148 mAh/g-285 mAh/g, the cathode active substance of the second battery cells has a specific capacity of 155 mAh/g-295 mAh/g, and the cathode active substance of the third battery cells has a specific capacity of 169 mAh/g-311 mAh/g.

Accordingly, by configuring the specific capacity of each of the first battery cells, the second battery cells, and the third battery cells within the above-mentioned ranges, it is possible to allow the discharge capacity of the first battery cells, the second battery cells, and the third battery cells at low temperatures approximately the same, thereby improving the overall energy retention rate of the battery pack at low temperatures.

In some embodiments, the cathode functional additive has a theoretical specific capacity of 350 mAh/g-410 mAh/g.

Accordingly, by utilizing a cathode functional additive with a theoretical specific capacity within the above-mentioned range, a sufficient energy density of each battery cell can be ensured and the low-temperature discharge power of each battery cell and the battery pack as a whole can be improved.

In some embodiments, the first cathode active substance is one selected from lithium manganate, lithium nickelate, lithium cobaltate, lithium nickel cobalt manganate, lithium nickel cobalt aluminate, and lithium iron phosphate.

Accordingly, as long as the discharge voltages and the proportions of the discharge capacities of the first discharge voltage plateau generated in the first cathode active substance and the second discharge voltage plateau generated in the cathode functional additive satisfy the above relationships, the first cathode active substance may be selected from various existing cathode active substances, and thus, it is possible to readily realize the battery pack of the present application utilizing the existing cathode active substances.

In some embodiments, when the first battery cells, the second battery cells, and the third battery cells utilize the same type of the first cathode active substance and the same type of the cathode functional additive, the respective mass percentages of the first cathode active substance in the cathode active substance in the first battery cells, the second battery cells, and the third battery cells decrease in order, and respective mass percentages of the cathode functional additive in the cathode active substance in the first battery cells, the second battery cells, and the third battery cells increase in order.

Since the proportion of the discharge capacity of the second discharge voltage plateau having a lower discharge voltage becomes larger and the low-temperature energy retention rate of the battery cell becomes higher when the mass percentage of the cathode functional additive which generates the second discharge voltage plateau is larger, by configuring such that the mass percentage of the cathode functional additive of the third battery cells in the third region>the mass percentage of the cathode functional additive of the second battery cells in the second region>the mass percentage of the cathode functional additive of the first battery cells in the first region, it is possible to allow the low-temperature energy retention rate of the third battery cells>the low-temperature energy retention rate of the second battery cells>the low-temperature energy retention rate of the first battery cells, so that the energy released by the first battery cells, the second battery cells, and the third battery cells at low temperatures is approximately the same, thereby further improving the overall energy retention rate of the battery pack at low temperatures.

In some embodiments, in the first battery cells, when a total mass of the first cathode active substance and the cathode functional additive is 100%, the first cathode active substance accounts for 96.0%-100% by mass and the cathode functional additive accounts for 0%-4.0% by mass.

Accordingly, by configuring the mass percentages of the first cathode active substance and the cathode functional additive in the first battery cells within the above-mentioned ranges, it is possible to allow the respective proportions of the discharge capacity corresponding to the first discharge voltage plateau and the discharge capacity corresponding to the second discharge voltage plateau in the first battery cells within the above-mentioned ranges, and it is possible to increase the amount of energy released by the first battery cells at low temperatures, and thereby enhance the overall low-temperature energy retention rate of the battery pack.

In some embodiments, in the second battery cells, when a total mass of the first cathode active substance and the cathode functional additive is 100%, the first cathode active substance accounts for 88.5%-96.0% by mass and the cathode functional additive accounts for 4.0%-11.5% by mass.

Accordingly, by configuring the mass percentages of the first cathode active substance and the cathode functional additive in the second battery cells within the above-mentioned ranges, it is possible to allow the respective proportions of the discharge capacity corresponding to the first discharge voltage plateau and the discharge capacity corresponding to the second discharge voltage plateau in the second battery cells within the above-mentioned ranges, and it is possible to increase the amount of energy released by the second battery cells at low temperatures, and thereby enhance the overall low-temperature energy retention rate of the battery pack.

In some embodiments, in the third battery cells, when a total mass of the first cathode active substance and the cathode functional additive is 100%, the first cathode active substance accounts for 76.5%-88.5% by mass and the cathode functional additive accounts for 11.5%-23.5% by mass.

Accordingly, by configuring the mass percentages of the first cathode active substance and the cathode functional additive in the third battery cells within the above-mentioned ranges, it is possible to allow the respective proportions of the discharge capacity corresponding to the first discharge voltage plateau and the discharge capacity corresponding to the second discharge voltage plateau in the third battery cells within the above-mentioned ranges, and it is possible to increase the amount of energy released by the third battery cells at low temperatures, and thereby enhance the overall low-temperature energy retention rate of the battery pack.

In some embodiments, the cathode functional additive is a carbon-coated lithium-containing titanium niobium oxide.

Accordingly, by carbon coating and pre-lithiation of the titanium niobium oxide as a cathode functional additive, it is possible to improve the electrical conductivity of the titanium niobium oxide and the effective amount of lithium ions in the battery cell, so as to improve the structural stability of the titanium niobium oxide as a cathode functional additive, and to ensure the energy density and cycle stability of the battery cell.

In some embodiments, an anode of each of the first battery cells, the second battery cells and the third battery cells undergoes a lithium replenishment treatment.

Accordingly, by conducting a lithium replenishment treatment on the respective anodes of the first battery cells, the second battery cells and the third battery cells, the lack of lithium ions due to the addition of titanium niobium oxide to the cathode active substance can be compensated for, so that the total effective amount of lithium ions in the battery cells does not decrease, thereby ensuring the energy density of the battery cells.

In some embodiments, at a temperature of 0° C. or lower, the first battery cells have a discharge cut-off voltage of 1.4 V-1.6V, the second battery cells have a discharge cut-off voltage of 1.2 V-1.4V, and the third battery cells have a discharge cut-off voltage of 1.0 V-1.2V.

Accordingly, by configuring the discharge cut-off voltages of the first battery cells, the second battery cells, and the third battery cells as described above, the energy released by the first battery cells, the second battery cells, and the third battery cells at low temperatures is capable of being approximately the same, and thus the overall energy retention rate of the battery pack at low temperatures can be improved.

In some embodiments, the number of the first battery cells:the number of the second battery cells:the number of the third battery cells=(3-8):(8-13):(10-15). In other words, when the sum of the number of the first battery cells, the number of second battery cells, and the number of third battery cells is 100%, the number of first battery cells accounts for about 10%-30%, the number of second battery cells accounts for about 25%-50%, and the number of third battery cells accounts for about 30%-60%.

Accordingly, the battery pack of the present application can be easily realized by simply arranging the numbers of the first battery cells, the second battery cells, and the third battery cells in accordance with the temperature distribution range of conventional battery packs.

A second aspect of the present application provides an electric device including the battery pack of the first aspect of the present application.

Accordingly, the electric device of the second aspect of the present application has a long battery life at low temperatures and is capable of operating normally over a long period of time even at low temperatures.

Advantageous Effects

With the present application, by configuring battery cells with different low-temperature energy retention rates having dual discharge voltage plateaus in regions with different temperatures inside a battery pack container, it can be provided a battery pack and an electric device including the battery pack in which the energy released by the battery cells in the regions with different temperatures at low temperatures is approximately the same and the overall energy retention rate at low temperatures is enhanced.

Figure 1:
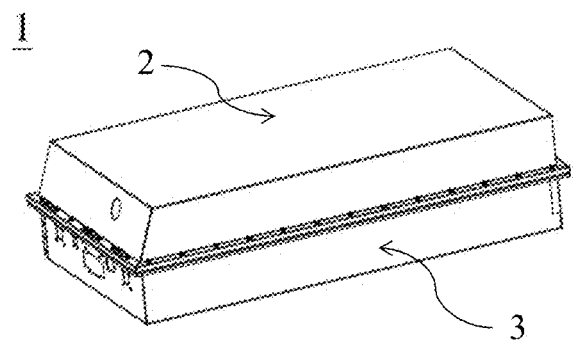
FIG. 1 is a schematic diagram of a structure of a battery pack according to an embodiment of the present application.

Reference numbers in the drawings are as follows:
1 battery pack; 2 upper container body; 3 lower container body: g1, g2 gap; BL1 first boundary line; BL2 second boundary line; BL3 third boundary line; R1 first region; R2 second region; R3 third region; 61 first battery cell; 62 second battery cell; and 63 third battery cell.

DETAILED DESCRIPTION OF THE EMBODIMENTS

Hereinafter, embodiments of the battery pack and the electric device of the present application will be specifically disclosed in detail with reference to the accompanying drawings. However, unnecessary detailed description may be omitted. For example, detailed descriptions of well-known items and repeated descriptions of substantially the same configurations may be omitted. This is to avoid the following description from becoming unnecessarily lengthy and to facilitate the understanding of those skilled in the art. In addition, the drawings and the following descriptions are provided for those skilled in the art to fully understand the present application, and are not intended to limit the subject matter described in the claims.

The "range" disclosed in the application is defined in the form of a lower limit and an upper limit, and the given range is limited by selecting a lower limit and an upper limit, and the selected lower limit and upper limit define the boundary of a special range. Ranges defined in this manner may be inclusive or exclusive and may be combined arbitrarily, i.e., any lower limit may be combined with any upper limit to form a range. For example, if ranges of 60-120 and 80-110 are listed for a particular parameter, it is understood that ranges of 60-110 and 80-120 are contemplated. Additionally, if the minimum range values 1 and 2 are listed, and if the maximum range values 3, 4, and 5 are listed, the following ranges are all expected: 1-3, 1-4, 1-5, 2-3, 2-4, and 2-5. In the present application, unless otherwise stated, the numerical range "a-b" represents an abbreviated representation of any combination of real numbers between a and b, where a and b are both real numbers. For example, the numerical range "0-5" indicates that all real numbers between "0-5" have been listed in this article, and "0-5" is only an abbreviated representation of the combination of these values. In addition, when expressing that a certain parameter is an integer ≥2, it is equivalent to disclosing that the parameter is an integer such as 2, 3, 4, 5, 6, 7, 8, 9, 10, 11, 12, etc.

Unless otherwise specified, all implementation modes and optional implementation modes of the present application may be combined with each other to form new technical proposals.

Unless otherwise specified, all technical features and optional technical features of the present application may be combined with each other to form new technical proposals.

Unless otherwise specified, all the steps in the present application may be performed sequentially or randomly, preferably sequentially. For example, the method including steps (a) and (b) means that the method may include steps (a) and (b) performed in sequence, and may also include steps (b) and (a) performed in sequence. For example, mentioning that the method may also include step (c), means that step (c) may be added to the method in any order, for example, the method may include steps (a), (b) and (c), may also include steps (a), (c) and (b), and may also include steps (c), (a) and (b).

Unless otherwise specified, "include" and "include" mentioned in the application represent an open type or a closed type. For example, the "include" and "include" may mean that other components not listed may be included or included, or only listed components may be included or included.

Unless otherwise specified, in the present application, the term "or" is inclusive. For example, the phrase "A or B" means "A, B, or both A and B." More specifically, the condition "A or B" is satisfied by either: A is true (or exists)

and B is false (or does not exist); A is false (or does not exist) and B is true (or exists); or both A and B are true (or exist).

The inventor has noted that when a battery pack including lithium-ion secondary battery cells is used in a low-temperature environment in winter, inconsistent charging and discharging performances of the battery cells at different locations in the battery pack will occur due to the different heat dissipation capabilities and thermal insulation effects of the battery cells at different locations in the battery pack. Specifically, when used in a low-temperature environment, the temperature of the battery cells located in an inner part of the battery pack is relatively high, and the discharge performance thereof under low temperature is relatively good, and the temperature of the battery cells located in an outer part of the battery pack is relatively low, and the discharge performance thereof under low temperature is relatively poor. The difference in the discharge capability of the battery cells in different parts of the battery pack at low temperatures leads to a significant reduction in the overall energy retention rate of the battery pack at low temperatures.

Thus, the inventor realized that configuring battery cells with better low-temperature discharge performance in the lower-temperature region of the battery pack could aid in achieving a substantially uniform energy discharge from all battery cells located in different parts of the battery pack in a low-temperature environment. This leads to an increase in the overall energy utilization of the battery pack in the low-temperature environment, which can increase the range of an electric device that uses the battery pack as a power source.

In order to achieve the above object, the inventors have repeatedly conducted research, and it has been found that battery cells having two discharge voltage plateaus arranged in the lower-temperature region enable continuing discharging at the lower discharge voltage plateau after discharging at the higher discharge voltage plateau, which increases the discharging amount of these battery cells, thus the battery cells exhibit a better discharge performance at low temperature.

There are various known substances having a lower discharge voltage plateau, and the inventor has found through repeated studies that titanium oxides, niobium oxides or titanium-niobium oxides, which are usually used as the anode active substances, have lower potentials with respect to lithium, and when these substances are added as the cathode functional additive to the conventional cathode active substances, these substances are capable of providing a lower discharge voltage plateau, which enables the battery cells to discharge more energy at lower temperatures, thereby improving the discharge amount of the battery cells thus enhancing the overall energy retention rate of the battery pack at lower temperatures.

Furthermore, in the case where the mass percentage of the cathode functional additive does not exceed a certain proportion (e.g., 50%) of the total mass of the cathode active substance (the sum of the mass of the conventional cathode active substance and the mass of the cathode functional additive) in the battery cell, as the proportion of the discharge capacity corresponding to the lower discharge voltage plateau to the total discharge capacity corresponding to the higher and lower discharge voltage plateaus becomes higher, the low-temperature performance of the battery cell will be enhanced. Therefore, by arranging battery cells with a higher proportion of the discharge capacity corresponding to the lower discharge voltage plateau in a region with a lower temperature, the energy released by the battery cells in various regions with different temperatures at low temperatures can be approximately the same, and the overall energy retention rate of the battery pack at low temperatures can be enhanced, thereby improving the low-temperature ranges of an electric device, such as an electric vehicle, in which the battery pack is used as a power source.

Battery Pack

The battery pack 1 of the present application is described in detail below.

Figure 2:
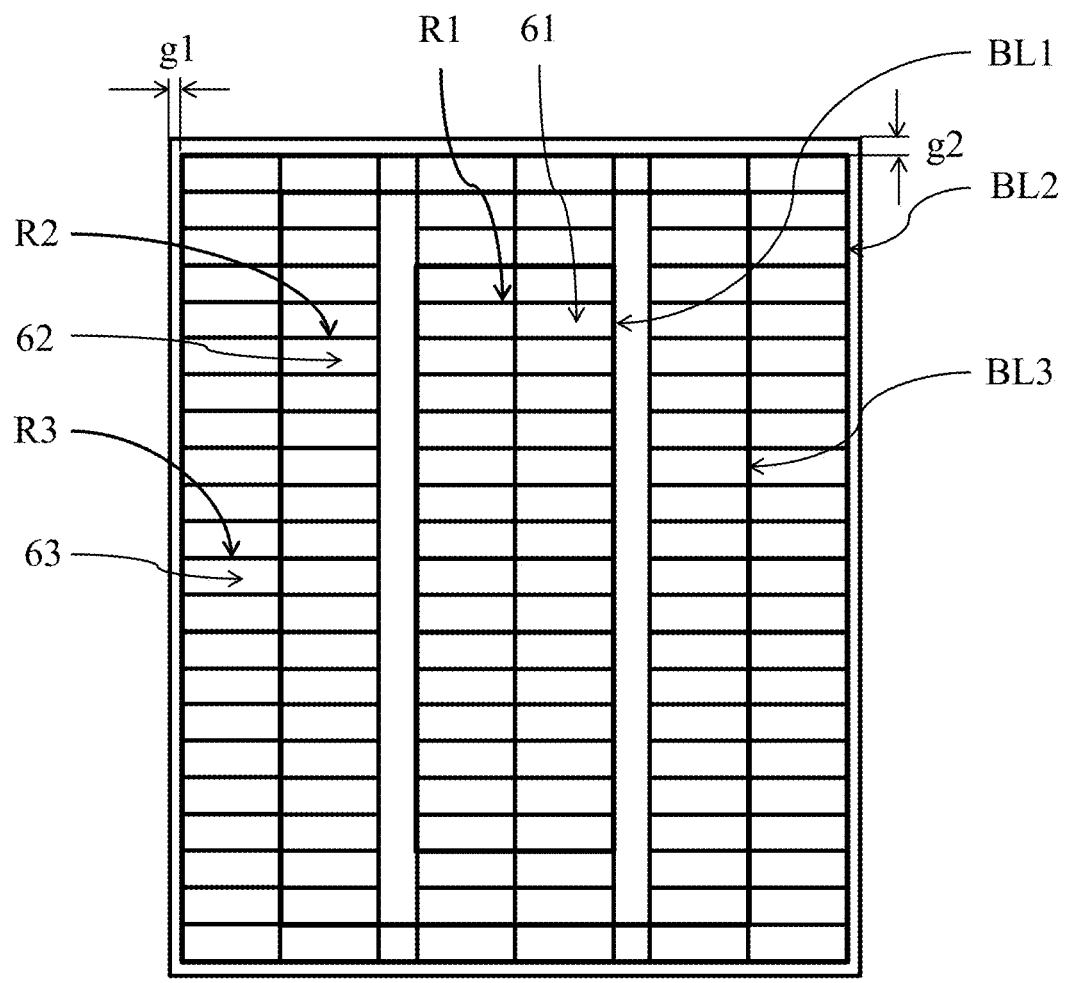
FIG. 2 is a top view of a structural assembly of the battery pack according to the embodiment of the present application shown in FIG. 1 with the container removed.

FIG. 1 is a schematic view of a structure of a battery pack 1 according to an embodiment of the present application. FIG. 2 is a top view of the structural assembly of the battery pack 1 shown in FIG. 1 with the case removed.

As shown in FIGS. 1 and 2, the battery pack 1 of the present application includes a battery container and a plurality of battery cells (61, 62, 63) disposed in the battery container. The battery container includes an upper container body 2 and a lower container body 3, the upper container 2 is capable of being covered on the lower container 3, forming a closed space (battery pack cavity) for accommodating the plurality of battery cells.

As shown in FIG. 2, a first region R1 is a substantially rectangular region surrounded by a first boundary line BL1 and located in a center part of a rectangular-shaped interior space of the battery pack container (e.g., the length and the width of the rectangular shape of the first region R1 may be substantially one-half of the length and the width of the rectangular shape of the interior space of the battery pack container, respectively), a second region R2 is a substantially annular region between the first boundary line BL1 and a third boundary line BL3, and a third region R3 is a substantially annular region between the second boundary line BL2 and the third boundary line BL3. The first boundary line BL1, the second boundary line BL2, and the third boundary line BL3 are virtual lines in order to clearly show the first, second, and third regions.

Further, first battery cells 61 are arranged in the first region R1, second battery cells 62 are arranged in the second region R2, and third battery cells 63 are arranged in the third region R3. The second battery cells 62 are arranged to surround the first battery cells 61, and the third battery cells 63 are arranged to surround the second battery cells 62. The first battery cells 61, the second battery cells 62 and the third battery cells 63 each has a first discharge voltage plateau and a second discharge voltage plateau, and an average discharge voltage of the first discharge voltage plateau is higher than an average discharge voltage of the second discharge voltage plateau. The cathode active substance of each of the first battery cells 61, the second battery cells 62 and the third battery cells 63 includes a mixture of a first cathode active substance having the first discharge voltage plateau and a cathode functional additive having the second discharge voltage plateau, and the cathode functional additive is a titanium oxide, a niobium oxide or a titanium-niobium oxide. In each of the first battery cells 61, the second battery cells 62 and the third battery cells 63, when the sum of the discharge capacity corresponding to the first discharge voltage plateau and the discharge capacity corresponding to the second discharge voltage plateau is 100%, the proportion of the discharge capacity corresponding to the second discharge voltage plateau in the third battery cells 63>the proportion of the discharge capacity corresponding to the second discharge voltage plateau in the second battery cells 62>the proportion of the discharge capacity corresponding to the second discharge voltage plateau in the first battery cells 61. When the battery pack 1 is placed in an external environment of the same temperature, the temperature of the third region R3 is lower than the temperature of the second region R2, and the temperature of the second region R2 is lower than the temperature of the first region R1.

It is to be noted that throughout the specification of the present application, although the first battery cells described herein have a first discharge voltage plateau and a second discharge voltage plateau, or the cathode substance of the first battery cells described herein is a mixture of a first cathode substance having a first discharge voltage plateau with a cathode functional aid having a second discharge voltage plateau, the first battery cells that include only a first discharge voltage plateau without a second discharge voltage plateau, namely the first battery cells formed only by the first cathode substance, is also within the scope of the present application.

Figure 3:
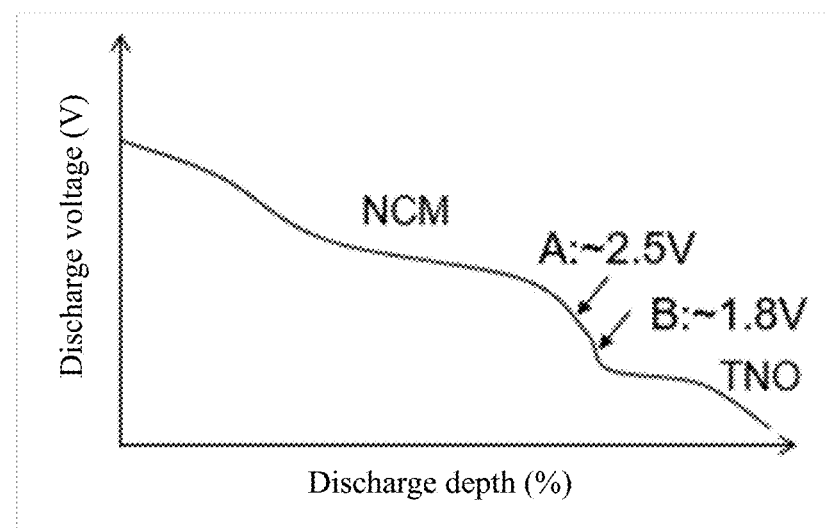
FIG. 3 is a schematic diagram of a constant-current discharge curve of a battery cell with a dual discharge voltage plateau used in a battery pack according to an embodiment of the present application, in which the cathode active substance of the battery cell includes a first cathode active substance of $LiNi_{0.6}Co_{0.2}Mn_{0.2}O_2$ (NCM) and a cathode functional additive of titanium niobium oxide (TNO), e.g., $TiNb_2O_7$)

It should be noted that the term "discharge voltage plateau" is a part of the discharge curve in which the discharge voltage is relatively stable, and the amount of discharge per unit time is higher when discharging at the discharge voltage plateau. FIG. 3 is a schematic diagram of a constant-current discharge curve of a battery cell having a dual discharge voltage plateau used in a battery pack of an embodiment of the present application. The cathode active substance of the battery cell consists of a first cathode active substance, $LiNi_{0.6}Co_{0.2}Mn_{0.2}O_2$ (NCM), and a cathode functional additive, titanium niobium oxide (TNO, e.g., $TiNb_2O_7$). As shown in FIG. 3, a lower limit of the discharge voltage plateau of the NCM is 2.5 V (point A in FIG. 3) and an upper limit of the discharge voltage plateau of the TNO is 1.8 V (point B in FIG. 3). In addition, as shown in FIG. 3, in the case where the discharge curve of the battery cell has two discharge voltage plateaus, the discharge voltage drops dramatically after passing through point A, and becomes stable after dropping to point B, at which point the battery cell continues to be discharged utilizing the discharge voltage plateau.

In FIG. 3, the part before point B at which the first rapid voltage drop ends is the first discharge voltage plateau (i.e., the higher-voltage discharge plateau, namely the first discharge voltage plateau of the present application), which is equal in terms of value to the ratio of all the energy discharged by the higher-voltage cathode active substance to the electric current (which is a balanced value that can also be roughly regarded as the average voltage before the point B), and part after the point B at which the first rapid voltage drop ends is the second discharge voltage plateau (i.e., the lower-voltage discharge plateau, which is the second discharge voltage plateau of the present application) is embodied as the ratio of all the energy discharged by the lower-voltage cathode active substance (e.g., the cathode functional additive in the present application) to the current (which is a balanced value that can be roughly regarded as an average voltage after the point B).

In the present application, the battery cells 61, 62, 63 having dual discharge voltage plateau (a first discharge voltage plateau with a higher discharge voltage and a second discharge voltage plateau with a lower discharge voltage) with different low-temperature energy retention rates are respectively arranged in regions with different temperatures in the interior space of the battery pack container, and the battery cells with a higher low-temperature energy retention rate are arranged in the lower-temperature region. Specifically, according to the temperature distribution inside the conventional battery pack, the temperature of the first region R1>the temperature of the second region R2>the temperature of the third region R3. In the present application, the proportion of the discharge capacity corresponding to the second discharge voltage plateau in the third battery cells 63>the proportion of the discharge capacity corresponding to the second discharge voltage plateau in the second battery cells 62>the proportion of the discharge capacity corresponding to the second discharge voltage plateau in the first battery cells 61.

It should be noted that the specific definition and the test method of the proportion of the discharge capacity corresponding to the second discharge voltage plateau in the first/second/third battery cells of the present application are described in the section of "Relevant tests" of this specification.

Battery cells at different positions in the battery pack have different heat dissipation capabilities. Usually, battery cells closer to the outer side have better heat dissipation ability, that is, the heat dissipation rate thereof is faster. As the battery cells are located closer to the interior of the battery pack, the heat dissipation rate of the battery cells is gradually reduced; on the contrary, as the battery cells are located closer to the outer side of the battery pack, the thermal insulation ability of the battery cells is gradually reduced. Therefore, the temperature of the battery cells in different regions of the battery pack is different, resulting in inconsistent charging and discharging performance thereof: for example, in a low-temperature external environment, the inner battery cells dissipate heat at a relatively slower rate, and the temperature is relatively high, and the performance thereof under the low-temperature external environment is relatively better (but the high-temperature performance is poorer); however, the outer battery cells dissipate heat at a relatively faster rate, the temperature is relatively low, and the performance thereof under the low-temperature external environment is relatively poor (but the high-temperature performance is better). As a result, the phenomenon that the battery cells in different regions of the battery pack have a great difference in their electrical performance under the low-temperature environment will reduce the overall energy retention rate of the battery pack under the low-temperature environment.

In order to solve the above problem, the inventors of the present application arrange the first battery cells 61, the second battery cells 62, and the third battery cells 63 with dual discharge voltage plateau (i.e., a first discharge voltage plateau with a relatively high discharge voltage and a second discharge voltage plateau with a relatively low discharge voltage) in the first region R1, the second region R2, and the third region R3 at different temperatures, so that after the discharge at the first discharge voltage plateau, it is possible to continue the discharge utilizing the second discharge voltage plateau (i.e., to realize a stepped discharge on the same battery cell), thereby increasing the energy released by each battery cell in a low-temperature environment, so as to be able to increase the overall low-temperature energy retention rate of the battery pack.

The cathode active substances of each of the first battery cells 61, the second battery cells 62 and the third battery cells 63 in the present application having a dual discharge voltage plateau are prepared by mixing a conventional cathode active substance (the first cathode active substance) and a cathode functional additive. The conventional cathode active substance has a first discharge voltage plateau with a higher discharge voltage, and the cathode functional additive is a titanium oxide, a niobium oxide, or a titanium-niobium oxide having a layered structure with the $ReO_3$ configuration, and these cathode functional additives have a second discharge voltage plateau with a lower discharge voltage. The discharge capacity of the second discharge voltage plateau with the lower discharge voltage in the battery cells can be adjusted by adjusting the content of the cathode functional additive in the cathode active substance.

Moreover, the inventors of the present application have found that by further adjusting the proportion of the discharge capacity corresponding to the respective second discharge voltage plateau in the first battery cells 61, the second battery cells 62 and the third battery cells 63, a battery pack 1 with a higher overall low-temperature energy retention rate can be obtained, and that such a configuration significantly improves the low-temperature energy retention rate of the battery pack under low-temperature conditions in winter. Specifically, by configuring the proportion of the discharge capacity corresponding to the second discharge voltage plateau in the third battery cells 63>the proportion of the discharge capacity corresponding to the second discharge voltage plateau in the second battery cells 62>the proportion of the discharge capacity corresponding to the second discharge voltage plateau in the first battery cells 61, the second battery cells 62 and the third battery cells 63 are able to continue to be discharged in a low-temperature environment in which the first battery cells 61 fail to be discharged, and the third battery cells 63 are able to continue to be discharged in a low-temperature environment in which the first battery cells 61 and the second battery cells 62 fail to be discharged, so as to ensure that the overall discharge capacity of the battery pack remains at a high level.

The present inventors further conducted an in-depth study of the relationship between the proportion of the discharge capacity corresponding to the second discharge voltage plateau in each of the battery cells 61, 61, 63 having dual discharge voltage plateaus in the respective regions R1, R2, and R3 at different temperatures and the overall energy retention rate of the battery pack at −20° C. It was found that, when the sum of the discharge capacity corresponding to the first discharge voltage plateau and the discharge capacity corresponding to the second discharge voltage plateau is 100% in each of the first battery cells 61, the second battery cells 62, and the third battery cells 63, by configuring the proportion of the discharge capacity corresponding to the second discharge voltage plateau in the third battery cells 63>the proportion of the discharge capacity corresponding to the second discharge voltage plateau in the second battery cells 62>the proportion of the discharge capacity corresponding to the second discharge voltage plateau in the first battery cells 61, it is possible to allow the low-temperature energy retention rate of the third battery cells 63>the low-temperature energy retention rate of the second battery cells 62>the low-temperature energy retention rate of the first battery cells 61, so that the energy released from the battery cells 61, 62, and 63 in the respective regions R1, R2, and R3 of the battery pack with different temperatures under a low temperature (the discharge capacity at a low temperature) is approximately the same, so as to be able to improve the overall low-temperature energy retention rate of the battery pack 1 (the total energy retention rate of the battery pack at −20° C.), and to improve the battery life of the battery pack under low temperatures.

As shown in FIG. 2, the battery cells located closer to the outer side amongst the plurality of battery cells may be in contact with an inner surface of the battery pack container (an upper container body 2, a lower container body 3), or with a structural member provided on the inner surface of the battery pack container. In the top view shown in FIG. 2, gaps g1, g2 are selectively formed between the outermost battery cells and the inner surface of the battery pack container, and various structural members of the battery pack may be disposed in these gaps g1, g2. A capacitor and the like may be selectively disposed in the gaps between different battery cells to improve the overall energy density of the battery pack.

In some embodiments, the cathode functional additive in the first battery cells 61, the second battery cells 62, and the third battery cells 63 is a titanium niobium oxide represented by $Ti_2Nb_{2x}O_{4+5x}$, where x is an integer of 1 or higher, and optionally, the titanium niobium oxide is one or more selected from $Ti_2Nb_2O_9$, $TiNb_2O_7$, $Ti_2Nb_{10}O_{29}$, and $TiNb_{24}O_{62}$.

Titanium-niobium oxides are generally produced by combining titanium oxides and niobium oxides in different ratios. Due to the similarity of the atomic radii of titanium and niobium, titanium-niobium oxides have a layered structure with the $ReO_3$ configuration, additionally, the titanium ion and the niobium ion also have similar electrochemical properties, and the difference in the oxidation-reduction potential between $Nb^{5+}/Nb^{4+}$, $Nb^{4+}/Nb^{3+}$ and $Ti^{4+}/Ti^{3+}$ is relatively small, all in a range of 1 V-2 V.

Accordingly, by selecting a titanium niobium oxide with excellent performance as a cathode functional additive, the first battery cells 61, the second battery cells 62, and the third battery cells 63 having a suitable second discharge voltage plateau can be obtained, so that the battery pack of the present application with excellent low-temperature performance can be realized.

The above-mentioned titanium-niobium oxide may be obtained commercially or prepared by the following method: adjusting the mass ratio of $TiO_2$ and $Nb_2O_5$ powders in accordance with a stoichiometric ratio of $Ti_2Nb_{2x}O_{4+5x}$, adding a solvent, which may be ethanol, water or acetone, and ball milling, drying, heating, and cooling the mixture to obtain the corresponding titanium-niobium oxide.

In some embodiments, the second discharge voltage plateau has a discharge voltage in a range of 1.0 V-2.0 V, optionally, the discharge capacity of the second discharge voltage plateau in a range of 1.2 V-1.6 V accounts for 50% or more, optionally 70% or more of the total discharge capacity of the second discharge voltage plateau.

Accordingly, by configuring the discharge voltage of the second discharge voltage plateau within the above range, it is possible to remarkably distinguish the discharge voltage of the second discharge voltage plateau from the discharge voltage of the first discharge voltage plateau, so as to achieve the above significant effect resulting from a dual discharge voltage plateau. With the proportion of the discharge capacity of the second discharge voltage plateau at 1.2 V-1.6 V to the total discharge capacity of the second discharge voltage plateau within the above-mentioned range, it is possible to ensure that the battery cells are able to release sufficient energy at low temperatures, and thereby ensure the overall low-temperature energy retention rate of the battery pack.

In some embodiments, in the first, second, and third battery cells 61, 62, 63, the difference between the lowest discharge voltage of the first discharge voltage plateau and the highest discharge voltage of the second discharge voltage plateau is 0.5 V or more, optionally 1.0 V or more.

Referring to FIG. 3, the expression "the lowest discharge voltage of the first discharge voltage plateau" in the present application refers to the discharge voltage corresponding to point A. and the expression "the highest discharge voltage of the second discharge voltage plateau" in the present application refers to the discharge voltage corresponding to point B.

For a battery cell having two discharge voltage plateaus, as the difference between the discharge voltages of the first discharge voltage plateau and the second discharge voltage plateau becomes larger, the above effect of the second discharge voltage plateau is more significant. If the difference between the lowest discharge voltage of the first discharge voltage plateau and the highest discharge voltage of the second discharge voltage plateau is less than 0.5 V, the difference between the discharge voltages of the first discharge voltage plateau and the second discharge voltage plateau is insignificant, and the effect of the second discharge voltage plateau mentioned above cannot be fully obtained.

By configuring the difference between the lowest discharge voltage of the first discharge voltage plateau and the highest discharge voltage of the second discharge voltage plateau in the above range, it is possible to continue the discharging utilizing the second discharge voltage plateau which has the lower discharge voltage after the discharging at the first discharge voltage plateau which has the higher discharge voltage, so that the amount of energy released by each battery cell at low temperatures can be improved, thereby improving the overall energy retention rate of the battery pack at low temperatures.

In some embodiments, in the first battery cells 61, when the sum of the discharge capacity corresponding to the first discharge voltage plateau and the discharge capacity corresponding to the second discharge voltage plateau is 100%, the discharge capacity corresponding to the first discharge voltage plateau accounts for 90%-100%, and the discharge capacity corresponding to the second discharge voltage plateau accounts for 0%-10%. The discharge capacity corresponding to the first discharge voltage plateau accounting for 100% and the discharge capacity corresponding to the second discharge voltage plateau accounting for 0% refers to the situation where the first battery cells 61 have only one discharge voltage plateau, and this is also within the scope of the present application.

Accordingly, by configuring the respective proportions of the discharge capacity corresponding to the first discharge voltage plateau and the discharge capacity corresponding to the second discharge voltage plateau in the first battery cells 61 within the above-mentioned ranges, it is possible to increase the amount of energy released by the first battery cells 61 at low temperatures, and thereby improving the overall low-temperature energy retention rate of the battery pack 1.

In some embodiments, in the second battery cells 62, when the sum of the discharge capacity corresponding to the first discharge voltage plateau and the discharge capacity corresponding to the second discharge voltage plateau is 100%, the discharge capacity corresponding to the first discharge voltage plateau accounts for 73%-95%, and the discharge capacity corresponding to the second discharge voltage plateau accounts for 5%-27%.

Accordingly, by configuring the respective proportions of the discharge capacity corresponding to the first discharge voltage plateau and the discharge capacity corresponding to the second discharge voltage plateau in the second battery cells 62 within the above-mentioned ranges, it is possible to increase the amount of energy released by the second battery cells 62 at low temperatures, and thereby improving the overall low-temperature energy retention rate of the battery pack 1.

In some embodiments, in the third battery cells 63, when the sum of the discharge capacity corresponding to the first discharge voltage plateau and the discharge capacity corresponding to the second discharge voltage plateau is 100%, the discharge capacity corresponding to the first discharge voltage plateau accounts for 54%-87%, and the discharge capacity corresponding to the second discharge voltage plateau accounts for 13%-46%.

Accordingly, by configuring the respective proportions of the discharge capacity corresponding to the first discharge voltage plateau and the discharge capacity corresponding to the second discharge voltage plateau in the third battery cells 63 within the above-mentioned ranges, it is possible to increase the amount of energy released by the third battery cells 63 at low temperatures, and thereby improving the overall low-temperature energy retention rate of the battery pack 1.

In some embodiments, the cathode active substance of the first battery cells 61 has a specific capacity of 148 mAh/g-285 mAh/g, the cathode active substance of the second battery cells has a specific capacity of 155 mAh/g-295 mAh/g, and the cathode active substance of the third battery cells has a specific capacity of 169 mAh/g-311 mAh/g.

Accordingly, by configuring the respective specific capacities of the first battery cells 61, the second battery cells 62, and the third battery cells 63 within the above-mentioned ranges, it is possible to allow the discharge capacity of the first battery cells 61, the second battery cells 62, and the third battery cells 63 at low temperatures approximately the same, thereby improving the overall energy retention rate of the battery pack 1 at low temperatures.

The specific capacity of the cathode active substance of each battery cell refers to an average specific capacity of the cathode active substance, which may be calculated, for example, on the basis of the respective specific capacities and mass percentages of the first cathode active substance and the cathode functional additive contained in the cathode active substance.

In some embodiments, the cathode functional additive has a theoretical specific capacity of 350 mAh/g-410 mAh/g.

Accordingly, by utilizing a cathode functional additive with a theoretical specific capacity within the above-mentioned range, a sufficient energy density of each battery cell can be ensured and the low-temperature discharge power of each battery cell and the battery pack as a whole can be improved.

In some embodiments, the first cathode active substance is one selected from lithium manganate, lithium nickelate, lithium cobaltate, lithium nickel cobalt manganate, lithium nickel cobalt aluminate, and lithium iron phosphate.

Accordingly, as long as the discharge voltages and the proportions of the discharge capacities of the first discharge voltage plateau generated in the first cathode active substance and the second discharge voltage plateau generated in the cathode functional additive satisfy the above relationships, the first cathode active substance may be selected from various existing cathode active substances, and thus, it is possible to readily realize the battery pack of the present application utilizing the existing cathode active substances.

In some embodiments, when the first battery cells 61, the second battery cells 62, and the third battery cells 63 utilize the same type of the first cathode active substance and the same type of the cathode functional additive, the respective mass percentages of the first cathode active substance in the cathode active substance of the first battery cells 61, the second battery cells 62, and the third battery cells 63 decrease in order, and respective mass percentages of the cathode functional additive in the cathode active substance of the first battery cells 61, the second battery cells 62, and the third battery cells 63 increase in order.

Since the proportion of the discharge capacity of the second discharge voltage plateau having a lower discharge voltage becomes larger and the low-temperature energy retention rate of the battery cell becomes higher when the mass percentage of the cathode functional additive which generates the second discharge voltage plateau is larger, by configuring such that the mass percentage of the cathode functional additive of the third battery cells 63 in the third region R3>the mass percentage of the cathode functional additive of the second battery cells 62 in the second region R2>the mass percentage of the cathode functional additive of the first battery cells 61 in the first region R1, it is possible to allow the low-temperature energy retention rate of the third battery cells 63>the low-temperature energy retention rate of the second battery cells 62>the low-temperature energy retention rate of the first battery cells 61, so that the energy released by the first battery cells 61, the second battery cells 62, and the third battery cells 63 at low temperatures is approximately the same, thereby further improving the overall energy retention rate of the battery pack 1 at low temperatures.

In some embodiments, in the first battery cells 61, when the total mass of the first cathode active substance and the cathode functional additive is 100%, the first cathode active substance accounts for 96.0%-100% by mass and the cathode functional additive accounts for 0%-4.0% by mass. The situation that the first cathode active substance accounts for 100% by mass and the cathode functional additive accounts for 0% by mass refers to that the first battery cells 61 are formed only by the first cathode active substance, and this is also within the scope of the present application.

Accordingly, by configuring the mass percentages of the first cathode active substance and the cathode functional additive in the first battery cells 61 within the above-mentioned ranges, it is possible to allow the respective proportions of the discharge capacity corresponding to the first discharge voltage plateau and the discharge capacity corresponding to the second discharge voltage plateau in the first battery cells 61 within the above-mentioned ranges, and it is possible to increase the amount of energy released by the first battery cells 61 at low temperatures, and thereby enhance the overall low-temperature energy retention rate of the battery pack 1.

In some embodiments, in the second battery cells 62, when a total mass of the first cathode active substance and the cathode functional additive is 100%, the first cathode active substance accounts for 88.5%-96.0% by mass and the cathode functional additive accounts for 4.0%-11.5% by mass.

Accordingly, by configuring the mass percentages of the first cathode active substance and the cathode functional additive in the second battery cells 62 within the above-mentioned ranges, it is possible to allow the respective proportions of the discharge capacity corresponding to the first discharge voltage plateau and the discharge capacity corresponding to the second discharge voltage plateau in the second battery cells 62 within the above-mentioned ranges, and it is possible to increase the amount of energy released by the second battery cells 62 at low temperatures, and thereby enhance the overall low-temperature energy retention rate of the battery pack 1.

In some embodiments, in the third battery cells 63, w % ben a total mass of the first cathode active substance and the cathode functional additive is 100%, the first cathode active substance accounts for 76.5%-88.5% by mass and the cathode functional additive accounts for 11.5%-23.5% by mass.

Accordingly, by configuring the mass percentages of the first cathode active substance and the cathode functional additive in the third battery cells 63 within the above-mentioned ranges, it is possible to allow the respective proportions of the discharge capacity corresponding to the first discharge voltage plateau and the discharge capacity corresponding to the second discharge voltage plateau in the third battery cells 63 within the above-mentioned ranges, and it is possible to increase the amount of energy released by the third battery cells 63 at low temperatures, and thereby enhance the overall low-temperature energy retention rate of the battery pack 1.

In some embodiments, the cathode functional additive is a carbon-coated lithium-containing titanium niobium oxide.

Accordingly, by pre-lithiation of lithium-lacking substances such as titanium niobium oxide, which is used as the cathode functional additive, it is possible to supplement the loss in lithium ions due to the reduction in the conventional cathode active substance, so that the battery cell has an adequate amount of lithium ions, and the energy density of the battery cell is ensured. In addition, the conductivity of the titanium niobium oxide can be improved by carbon coating the titanium niobium oxide after the pre-lithiation treatment. Thereby, the structural stability of the titanium niobium oxide as the cathode functional additive can be improved, and the energy density and cycle stability of the battery cell can be ensured.

The pre-lithiation of the titanium niobium oxide may adopt a well-known method of pre-lithiation of a lithium-lacking substance, for example, the following method: mixing the prepared titanium niobium oxide with lithium carbonate, compacting and placing the mixture in an alumina ceramic crucible, heating up to the melting temperature of lithium carbonate in a blast furnace, and then cooling down to room temperature for ball milling and dispersion, and obtaining a pre-lithiated product. By pre-lithiation of titanium-niobium oxide, the first-cycle efficiency of the battery can be improved.

The carbon coating process of the titanium niobium oxide after pre-lithiation may adopt a well-known carbon coating method, for example, the following method: according to the ratio between each element of the titanium niobium oxide ($Ti_2Nb_{2x}O_{4+5x}$) and the desired amount of carbon coating, adjusting a mass ratio of the pre-lithiated titanium niobium oxide to glucose, adding a solvent, which may be ethanol, water, or acetone, and carrying out ball milling, drying, granulation, and calcination process on the mixture to obtain a carbon-coated lithium-containing material. By carbon coating the pre-lithiated titanium niobium oxide, the electrical conductivity of the titanium niobium oxide can be improved.

In some embodiments, the anode of each of the first battery cells 61, the second battery cells 62, and the third battery cells 63 is subjected to a lithium replenishment treatment.

Accordingly, by applying a lithium replenishment treatment to the anode of each of the first battery cells 61, the second battery cells 62, and the third battery cells 63, the lack of lithium ions due to the addition of titanium niobium oxide to the cathode active substance can be compensated for, so that the total effective amount of lithium ions in the battery cells is not reduced, and thus the energy density of the battery cell is ensured.

The lithium replenishment of the anode may adopt various well-known methods, for example, the following method: (1) mixing a binder, a lithium powder and an organic solvent to obtain a lithium powder solution; (2) applying the lithium powder solution to an anode plate in a physical manner; and (3) drying and cold pressing the anode plate to obtain a pre-lithiated anode plate. By performing lithium replenishment on the anode, the first-cycle efficiency of the battery can be improved.

It is sufficient to perform only one of the pre-lithiation treatment of the cathode functional additive and the lithium replenishment treatment of the anode.

In some embodiments, at a temperature of 0° C. or lower, the first battery cells have a discharge cut-off voltage of 1.4 V-1.6V, the second battery cells have a discharge cut-off voltage of 1.2 V-1.4V, and the third battery cells have a discharge cut-off voltage of 1.0 V-1.2V.

Accordingly, by configuring the discharge cut-off voltages of the first battery cells 61, the second battery cells 62, and the third battery cells 63 as described above, the energy released by the first battery cells 61, the second battery cells 62, and the third battery cells 63 at low temperatures is capable of being approximately the same, and thus the overall energy retention rate of the battery pack at low temperatures can be improved.

A charge cut-off voltage being too high or a discharge cut-off voltage being too low will damage the cycling performance of the battery cell. In the case of the charge cut-off voltage being too high, the battery cell will be overcharged, the continued charging of a battery cell that is fully charged will lead to structural change in the cathode material, resulting in a loss of capacity, and oxygen generated by the decomposition of the cathode material will rigorously react with the electrolyte, which may lead to an explosion. In the case of the discharge cut-off voltage is too low, the battery cell will be over-discharged, which will cause a rise in the internal pressure of the battery cell, and the reversibility of the cathode and anode active materials will be damaged, leading to only partial restoration during charging and a deteriorated capacity. Deep charging and deep discharging of battery cells will promote the consumption of the battery cells. Ideal working conditions for battery cells are shallow charging and shallow discharging, so as to extend the life of the battery cell.

In some embodiments, the number of the first battery cells 61:the number of the second battery cells 62:the number of the third battery cells 63=(3-8):(8-13):(10-15). In other words, when the sum of the number of the first battery cells 61, the number of second battery cells 62, and the number of third battery cells 63 is 100%, the number of first battery cells 61 accounts for about 10%-30%, the number of second battery cells 62 accounts for about 25-50%, and the number of third battery cells 63 accounts for about 30%-60%.

In some embodiments, the number of the first battery cells 61 may be 1.

Accordingly, the battery pack of the present application can be easily realized by simply arranging the numbers of the first battery cells 61, the second battery cells 62, and the third battery cells 63 in accordance with the temperature distribution range of conventional battery packs.

Electric Device

In addition, the present application provides an electric device, the electric device includes a battery pack of the present application. The battery pack may be used as a power source for the electric device or as an energy storage unit for the electric device. The electric device may include, but is not limited to, mobile devices (e.g., cellular phones, laptop computers, etc.), electric vehicles (e.g., pure electric vehicles, hybrid electric vehicles, plug-in hybrid electric vehicles, electric bicycles, electric scooters, electric golf carts, electric trucks, etc.), electric trains, ships and satellites, energy storage systems, and the like.

The electric device may select a battery cell or a battery pack according to the requirements for use.

Figure 4:
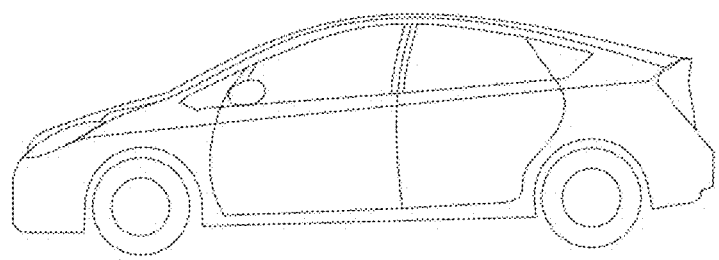
FIG. 4 is a schematic diagram of an electric device using the battery pack according to the embodiment of the present application as a power source.

FIG. 4 shows an exemplary electric device. The electric device is a pure electric vehicle, a hybrid electric vehicle, or a plug-in hybrid electric vehicle, or the like. The electric device may adopt the battery pack of the present application for range capability at low temperatures.

EXAMPLES

Examples of the present application are described below. The examples described below are exemplary and are only for explaining the present application and are not to be construed as a limitation to the present application. Where specific techniques or conditions are not indicated in the examples, they are conducted in accordance with the techniques or conditions described in the literature in the art or the product specification. Where no manufacturer is indicated for the reagents or instruments used, they are conventional products that can be commercially obtained.

(1) Preparation of Battery Cells

I. Preparation of First Battery Cell

Preparation Example I-1

1) Preparation of Cathode Plate

A first cathode active substance $LiNi_{0.6}Co_{0.2}Mn_{0.2}O_2$ (NCM) and a cathode functional additive $TiNb_2O_7$ as a cathode active substance, superconducting carbon black SP as a conductive agent, and polyvinylidene fluoride (PVDF) as a binder were dispersed and homogeneously mixed in N-methylpyrrolidone (NMP) as a solvent to obtain a cathode slurry; the cathode slurry was uniformly coated on an aluminum foil as a cathode current collector, dried, cold pressed, slit, and cut to obtain a cathode plate.

The cathode functional additive was pre-lithiated and carbon coated in advance, a mass ratio between the cathode active substance, the conductive carbon black, and the binder PVDF was 96:2:2, and a mass ratio of the cathode functional additive $TiNb_2O_7$ to the first cathode active substance NCM was 2:98.

2) Preparation of Anode Plate

An anode active material of graphite, superconducting carbon black SP as a conductive agent, SBR as a binder, and CMC-Na as a thickener were dispersed and homogeneously mixed in deionized water as a solvent according to a mass ratio of 96:1:1:2 to obtain an anode slurry; the anode slurry was uniformly coated on a copper foil as an anode current collector, dried, cold pressed, slit, and cut to obtain an anode plate.

3) Separator

Polyethylene film was selected as the separator.

4) Preparation of Electrolyte

Ethylene carbonate (EC), dimethyl carbonate (DMC), and diethyl carbonate (DEC) were mixed homogeneously according to a volume ratio of 1:1:1 to obtain an organic solvent, a sufficiently dried lithium salt $LiPF_6$ was dissolved in the mixed organic solvent to formulate an electrolyte with a concentration of 1 mol/L.

5) Preparation of Battery Cell

The above-mentioned cathode plate, separator, and anode plate were stacked in sequence so that the separator was disposed between the cathode plate and anode plate for separation, and a battery core was obtained by winding; the battery core was placed in an outer packaging shell, dried and injected with an electrolyte solution, followed by vacuum encapsulation, standing still, formation, shaping, and the like, to obtain a first battery cell I-1.

Preparation Example I-2

A first battery cell I-2 was obtained following the same operation as in Preparation example I-1, except that a first cathode active substance $LiNi_{0.6}Co_{0.2}Mn_{0.2}O_2$(NCM) and a cathode functional additive $TiO_2$ were used for the cathode active substance.

Preparation Example I-3

A first battery cell I-3 was obtained following the same operation as in Preparation example I-1, except that a first cathode active substance $LiNi_{0.6}Co_{0.2}Mn_{0.2}O_2$ (NCM) and a cathode functional additive $Nb_2O_5$ were used for the cathode active substance.

Preparation Example I-4

A first battery cell I-4 was obtained following the same operation as in Preparation example I-1, except that a first cathode active substance, lithium iron phosphate (LFP), and a cathode functional additive $TiNb_2O_7$ were used for the cathode active substance.

Preparation Example I-5

A first battery cell I-5 was obtained following the same operation as in Preparation example I-1, except that a first cathode active substance, lithium manganese oxide (LMO), and a cathode functional additive $TiNb_2O_7$ were used for the cathode active substance.

Preparation Example I-6

A first battery cell I-6 was obtained following the same operation as in Preparation example I-1, except that a first cathode active substance $LiNi_{0.6}Co_{0.2}Mn_{0.2}O_2$ (NCM) and a cathode functional additive $Ti_2Nb_2O_9$ were used for the cathode active substance.

Preparation Example I-7

A first battery cell I-7 was obtained following the same operation as in Preparation example I-1, except that a first cathode active substance $LiNi_{0.6}Co_{0.2}Mn_{0.2}O_2$ (NCM) and a cathode functional additive $Ti_2Nb_{10}O_{29}$ were used for the cathode active substance.

Preparation Example I-8

A first battery cell I-8 was obtained following the same operation as in Preparation example I-1, except that a first cathode active substance $LiNi_{0.6}Co_{0.2}Mn_{0.2}O_2$ (NCM) and a cathode functional additive $TiNb_{24}O_{62}$ were used for the cathode active substance.

Preparation Example I-9

A first battery cell I-9 was obtained following the same operation as in Preparation example I-1, except that a first cathode active substance, lithium iron phosphate (LFP), and a cathode functional additive $Ti_2Nb_2O_9$ were used for the cathode active substance.

Preparation Example I-10

A first battery cell I-10 was obtained following the same operation as in Preparation example I-1, except that a first cathode active substance, lithium manganese oxide (LMO), and a cathode functional additive $Ti_2Nb_{10}O_{29}$ were used for the cathode active substance.

Preparation Example I-11

A first battery cell I-11 was obtained following the same operation as in Preparation example I-1, except that only NCM was adopted for the cathode active substance.

Preparation Example I-12

A first battery cell I-12 was obtained following the same operation as in Preparation example I-1, except that a mass ratio of the cathode functional additive $TiNb_2O_7$ to the first cathode active substance NCM was 11.5:88.5.

Preparation Example I-13

A first battery cell I-13 was obtained following the same operation as in Preparation example I-1, except that only LFP was adopted for the cathode active substance.

Preparation Example I-14

A first battery cell I-14 was obtained following the same operation as in Preparation example I-4, except that a mass ratio of the cathode functional additive $TiNb_2O_7$ to the first cathode active substance LFP was 4:96.

II. Preparation of Second Battery Cell

Preparation Example II-1

A second battery cell II-1 was obtained following the same operation as in Preparation example I-1, except that a mass ratio of the cathode functional additive $TiNb_2O_7$ to the first cathode active substance NCM was 6.5:93.5.

Preparation Example II-2

A second battery cell II-2 was obtained following the same operation as in Preparation example I-2, except that a mass ratio of the cathode functional additive $TiO_2$ to the first cathode active substance NCM was 6.5:93.5.

Preparation Example II-3

A second battery cell II-3 was obtained following the same operation as in Preparation example I-3, except that a mass ratio of the cathode functional additive $Nb_2O_5$ to the first cathode active substance NCM was 6.5:93.5.

Preparation Example II-4

A second battery cell II-4 was obtained following the same operation as in Preparation example I-4, except that a mass ratio of the cathode functional additive $TiNb_2O_7$ to the first cathode active substance LFP was 6.5:93.5.

Preparation Example II-5

A second battery cell II-5 was obtained following the same operation as in Preparation example I-5, except that a mass ratio of the cathode functional additive $TiNb_2O_7$ to the first cathode active substance LMO was 6.5:93.5.

Preparation Example II-6

A second battery cell II-6 was obtained following the same operation as in Preparation example I-6, except that a mass ratio of the cathode functional additive $Ti_2Nb_2O_9$ to the first cathode active substance NCM was 6.5:93.5.

Preparation Example II-7

A second battery cell II-7 was obtained following the same operation as in Preparation example I-7, except that a mass ratio of the cathode functional additive $Ti_2Nb_{10}O_{29}$ to the first cathode active substance NCM was 6.5:93.5.

Preparation Example II-8

A second battery cell II-8 was obtained following the same operation as in Preparation example I-8, except that a mass ratio of the cathode functional additive $TiNb_{24}O_{62}$ to the first cathode active substance NCM was 6.5:93.5.

Preparation Example II-9

A second battery cell II-9 was obtained following the same operation as in Preparation example I-9, except that a mass ratio of the cathode functional additive $Ti_2Nb_2O_9$ to the first cathode active substance LFP was 6.5:93.5.

Preparation Example II-10

A second battery cell II-10 was obtained following the same operation as in Preparation example I-10, except that a mass ratio of the cathode functional additive $Ti_2Nb_{10}O_{29}$ to the first cathode active substance LMO was 6.5:93.5.

Preparation Example II-11

A second battery cell II-11 was obtained following the same operation as in Preparation example I-11.

Preparation Example II-12

A second battery cell II-12 was obtained following the same operation as in Preparation example I-1, except that only LFP was adopted for the cathode active substance.

Preparation Example II-13

A second battery cell II-13 was obtained following the same operation as in Preparation example I-1.

Preparation Example II-14

A second battery cell II-14 was obtained following the same operation as in Preparation example I-1, except that a mass ratio of the cathode functional additive $TiNb_2O_7$ to the first cathode active substance NCM was 4:96.

Preparation Example II-15

A second battery cell II-15 was obtained following the same operation as in Preparation example I-4, except that a mass ratio of the cathode functional additive $TiNb_2O_7$ to the first cathode active substance LFP was 11.5:88.5.

Preparation Example II-16

A second battery cell II-16 was obtained following the same operation as in Preparation example I-1, except that a first cathode active substance, lithium manganese oxide (LMO), and a cathode functional additive $Ti_2Nb_2O_9$ were used for the cathode active substance and a mass ratio of the cathode functional additive $Ti_2Nb_2O_9$ to the first cathode active substance LMO was 11.5:88.5.

Preparation Example II-17

A second battery cell II-17 was obtained following the same operation as in Preparation example I-1, except that a mass ratio of the cathode functional additive $TiNb_2O_7$ to the first cathode active substance NCM was 20:80.

III. Preparation of Third Battery Cell

Preparation Example III-11

A third battery cell III-1 was obtained following the same operation as in Preparation example I-1, except that a mass ratio of the cathode functional additive $TiNb_2O_7$ to the first cathode active substance NCM was 11.5:88.5.

Preparation Example III-2

A third battery cell III-2 was obtained following the same operation as in Preparation example I-2, except that a mass ratio of the cathode functional additive $TiO_2$ to the first cathode active substance NCM was 11.5:88.5.

Preparation Example III-3

A third battery cell III-3 was obtained following the same operation as in Preparation example I-3, except that a mass ratio of the cathode functional additive $Nb_2O_3$ to the first cathode active substance NCM was 11.5:88.5.

Preparation Example III-4

A third battery cell III-4 was obtained following the same operation as in Preparation example I-4, except that a mass ratio of the cathode functional additive $TiNb_2O_7$ to the first cathode active substance LFP was 11.5:88.5.

Preparation Example III-5

A third battery cell III-5 was obtained following the same operation as in Preparation example I-5, except that a mass ratio of the cathode functional additive $TiNb_2O_7$ to the first cathode active substance LMO was 11.5:88.5.

Preparation Example III-6

A third battery cell III-6 was obtained following the same operation as in Preparation example I-6, except that a mass ratio of the cathode functional additive $Ti_2Nb_2O_9$ to the first cathode active substance NCM was 11.5:88.5.

Preparation Example III-7

A third battery cell III-7 was obtained following the same operation as in Preparation example I-7, except that a mass ratio of the cathode functional additive $Ti_2Nb_{10}O_{29}$ to the first cathode active substance NCM was 11.5:88.5.

Preparation Example III-8

A third battery cell III-8 was obtained following the same operation as in Preparation example I-8, except that a mass ratio of the cathode functional additive $TiNb_{24}O_{62}$ to the first cathode active substance NCM was 11.5:88.5.

Preparation Example III-9

A third battery cell III-9 was obtained following the same operation as in Preparation example I-9, except that a mass ratio of the cathode functional additive $Ti_2Nb_2O_9$ to the first cathode active substance LFP was 11.5:88.5.

Preparation Example III-10

A third battery cell III-10 was obtained following the same operation as in Preparation example I-10, except that a mass ratio of the cathode functional additive $Ti_2Nb_{10}O_{29}$ to the first cathode active substance LMO was 11.5:88.5.

Preparation Example III-11

A third battery cell III-11 was obtained following the same operation as in Preparation example I-11.

Preparation Example III-12

A third battery cell III-12 was obtained following the same operation as in Preparation example I-1, except that only LMO was adopted for the cathode active substance.

Preparation Example III-13

A third battery cell III-13 was obtained following the same operation as in Preparation example I-1.

Preparation Example III-14

A third battery cell III-14 was obtained following the same operation as in Preparation example I-1, except that a mass ratio of the cathode functional additive $TiNb_2O_7$ to the first cathode active substance NCM was 23.5:76.5.

Preparation Example III-15

A third battery cell III-15 was obtained following the same operation as in Preparation example I-4, except that a mass ratio of the cathode functional additive $TiNb_2O_7$ to the first cathode active substance LFP was 23.5:76.5.

Preparation Example III-16

A third battery cell III-16 was obtained following the same operation as in Preparation example II-16, except that a mass ratio of the cathode functional additive $Ti_2Nb_2O_9$ to the first cathode active substance LMO was 23.5:76.5.

(2) Assembly of Battery Pack

Example 1

As shown in FIG. 2, an interior space of the battery pack container was divided into a first region R1, a second region R2 and a third region R3, and the first battery cells I-1 were arranged in the first region R1 as the first battery cells 61, the second battery cells II-1 were arranged in the second region R2 as the second battery cells 62, and the third battery cells III-1 were arranged in the third region R3 as the third battery cells 63 to assemble a battery pack. The number of the first battery cells 61:the number of the second battery cells 62:the number of the third battery cells 63=12:32:40.

Example 2

A battery pack was assembled following the same operation as in Example 1, except that the first battery cells I-2 were used instead of the first battery cells I-1, the second battery cells II-2 were used instead of the second battery cells II-1, and the third battery cells III-2 were used instead of the third battery cells III-1.

Example 3

A battery pack was assembled following the same operation as in Example 1, except that the first battery cells I-3 were used instead of the first battery cells I-1, the second battery cells II-3 were used instead of the second battery cells II-1, and the third battery cells III-3 were used instead of the third battery cells III-1.

Example 4

A battery pack was assembled following the same operation as in Example 1, except that the first battery cells I-4 were used instead of the first battery cells I-1, the second battery cells II-4 were used instead of the second battery cells II-1, and the third battery cells III-4 were used instead of the third battery cells III-1.

Example 5

A battery pack was assembled following the same operation as in Example 1, except that the first battery cells I-5 were used instead of the first battery cells I-1, the second battery cells II-were used instead of the second battery cells II-1, and the third battery cells III-5 were used instead of the third battery cells III-1.

Example 6

A battery pack was assembled following the same operation as in Example 1, except that the first battery cells I-6 were used instead of the first battery cells I-1, the second battery cells II-6 were used instead of the second battery cells II-1, and the third battery cells III-6 were used instead of the third battery cells III-1.

Example 7

A battery pack was assembled following the same operation as in Example 1, except that the first battery cells I-7 were used instead of the first battery cells I-1, the second battery cells II-7 were used instead of the second battery cells II-1, and the third battery cells III-7 were used instead of the third battery cells III-1.

Example 8

A battery pack was assembled following the same operation as in Example 1, except that the first battery cells I-8 were used instead of the first battery cells I-1, the second battery cells II-8 were used instead of the second battery cells II-1, and the third battery cells III-8 were used instead of the third battery cells III-1.

Example 9

A battery pack was assembled following the same operation as in Example 1, except that the first battery cells I-9 were used instead of the first battery cells I-1, the second battery cells II-9 were used instead of the second battery cells II-1, and the third battery cells III-9 were used instead of the third battery cells III-1.

Example 10

A battery pack was assembled following the same operation as in Example 1, except that the first battery cells I-10 were used instead of the first battery cells I-1, the second battery cells II-10 were used instead of the second battery cells II-1, and the third battery cells III-10 were used instead of the third battery cells III-1.

Example 11

A battery pack was assembled following the same operation as in Example 1, except that the first battery cells I-11 were used instead of the first battery cells I-1, and the second battery cells II-14 were used instead of the second battery cells II-1.

Example 12

A battery pack was assembled following the same operation as in Example 1, except that the first battery cells I-11 were used instead of the first battery cells I-1, the second battery cells II-14 were used instead of the second battery cells II-1, and the third battery cells III-14 were used instead of the third battery cells III-1.

Example 13

A battery pack was assembled following the same operation as in Example 1, except that the first battery cells I-13 were used instead of the first battery cells I-1, the second battery cells II-15 were used instead of the second battery cells II-1, and the third battery cells III-15 were used instead of the third battery cells III-1.

Example 14

A battery pack was assembled following the same operation as in Example 1, except that the first battery cells I-14 were used instead of the first battery cells I-1, the second battery cells II-16 were used instead of the second battery cells II-1, and the third battery cells III-16 were used instead of the third battery cells III-1.

Example 15

A battery pack was assembled following the same operation as in Example 1, except that the first battery cells I-12 were used instead of the first battery cells I-1, the second battery cells II-17 were used instead of the second battery cells II-1, and the third battery cells III-14 were used instead of the third battery cells III-1.

Example 16

A battery pack was assembled following the same operation as in Example 1.

Example 17

A battery pack was assembled following the same operation as in Example 1.

Example 18

A battery pack was assembled following the same operation as in Example 1.

Example 19

A battery pack was assembled following the same operation as in Example 1.

Comparative Example 1

A battery pack was assembled following the same operation as in Example 1, except that the first battery cells I-11 were used instead of the first battery cells I-1, the second battery cells II-11 were used instead of the second battery cells II-1, and the third battery cells III-II were used instead of the third battery cells III-1.

Comparative Example 2

A battery pack was assembled following the same operation as in Example 1, except that the first battery cells I-11 were used instead of the first battery cells I-1, the second battery cells II-12 were used instead of the second battery cells II-1, and the third battery cells III-12 were used instead of the third battery cells III-1.

Comparative Example 3

A battery pack was assembled following the same operation as in Example 1, except that the second battery cells II-13 were used instead of the second battery cells II-1, and the third battery cells III-13 were used instead of the third battery cells III-1.

Comparative Example 4

A battery pack was assembled following the same operation as in Example 1, except that the first battery cells I-12 were used instead of the first battery cells I-1, and the third battery cells III-13 were used instead of the third battery cells III-1.

It is to be noted that although in the examples of the present application, the interior space of the battery pack container was divided into a first region, a second region and a third region, the battery pack of the present application is not limited to the case where the interior space of the battery pack container is divided into three regions, but one or more regions may also be provided on the outside of the third region, in addition to the first region, the second region and the third region, so long as the battery cells in the outer region are arranged surrounding the battery cells in the inner region thereof.

In the case where the interior space of the battery pack container includes three or more regions as described above, the battery pack of the present application satisfies that the proportion of the discharge capacity corresponding to the second discharge voltage plateau in the battery cells in regions toward the outer side is higher (i.e., the mass percentage of the cathode functional additive in the cathode active substance of these battery cells is higher).

Furthermore, in a case where the interior space of the battery pack container has a rectangular shape, four corners of the rectangular shape may be considered as outermost regions, and the proportion of the discharge capacity corresponding to the second discharge voltage plateau in the battery cells in these regions is the highest (i.e., the mass percentage of the cathode functional additive in the cathode active substance of these battery cells is highest).

(3) Relevant Tests

1. Determination of the discharge capacity corresponding to the first discharge voltage plateau and the discharge capacity corresponding to the second discharge voltage plateau in the battery cells.

The first battery cells, the second battery cells and the third battery cells in each battery pack of Examples 1-19 and Comparative examples 1-4 were tested for the discharge capacity corresponding to the first discharge voltage plateau and the discharge capacity corresponding to the second discharge voltage plateau in each of the first battery cells, the second battery cells and the third battery cells, at 25° C., respectively, using a Neware power battery tester (model No. BTS-5V300A-4CH), and proportions of the discharge capacities corresponding to the respective second discharge voltage plateaus of each of the first battery cells, the second battery cells and the third battery cells were calculated, respectively.

The discharge capacity of the battery cells was measured as follows.
(1) a battery cell was left to stand for 2 hours to ensure that the temperature of the battery cell was 25° C.;
(2) the battery cell was charged at 0.33 C under 25° C. to the charge cut-off voltage shown in Table 1 below, and continued being charged at a constant voltage of this charge cut-off voltage until the current was 0.05 C and the charging was cutoff (where C referred to the rated capacity of the battery cell);
(3) the battery cell was left to stand for 1 hour at 25° C.;
(4) the battery cell was discharged at 0.33 C under 25° C. to the discharge cut-off voltage shown in Table 1 below, and a total discharge capacity C0 of the battery cell was recorded; and
(5) a discharge curve, for example, as in FIG. 3 of the present application, was derived from step (4), in the discharge curve shown in FIG. 3, a sum of the discharge capacity before point B was the discharge capacity C1 corresponding to the first discharge voltage plateau, and the discharge capacity from point B to the discharge cut-off voltage was the discharge capacity C2 corresponding to the second discharge voltage plateau.

Therefore, the proportion of discharge capacity corresponding to the first discharge voltage plateau in the battery cell=C1/C0, and the proportion of discharge capacity corresponding to the second discharge voltage plateau in the battery cell=C2/C0.

TABLE 1

| Type of cathode active substance | Charge cut-off voltage (V) | Discharge cut-off voltage (V) |
|---|---|---|
| NCM + $TiNb_2O_7$ | 4.40 | 1.45 |
| NCM + $TIO_2$ | 4.40 | 1.45 |
| NCM + $Nb_2O_5$ | 4.40 | 1.45 |
| LFP + $TiNb_2O_7$ | 3.80 | 1.45 |
| LMO + $TiNb_2O_7$ | 4.40 | 1.45 |
| NCM + $Ti2Nb_2O_9$ | 4.40 | 1.45 |
| NCM + $Ti_zNb_{10}O_{29}$ | 4.40 | 1.45 |
| NCM + $TINb_{24}O_{62}$ | 4.40 | 1.45 |
| LFP + $Ti2Nb_2O_9$ | 3.80 | 1.45 |
| LMO + $Ti2Nb_{10}O_{29}$ | 4.40 | 1.45 |
| LMO + $Ti2Nb_2O_9$ | 4.40 | 1.45 |

2. Determination of Total Energy Retention Rate of Battery Pack at −20° C.

Furthermore, respective battery packs in Examples 1-19 and Comparative examples 1-4 were tested for the total full discharge energy at 25° C. and the total full discharge energy at −20° C. of each battery pack using a Neware power battery tester (model No. BTS-5V300A-4CH), respectively, and respective total energy retention rates (%) at −20° C. of the battery packs was calculated by dividing the total full-discharge energy at −20° C. by the total full-discharge energy of the battery pack at 25° C. of each battery pack.

Measurement of the total full-discharge energy at 25° C. of the battery packs was conducted in accordance with "7.1.2 Capacity and Energy Test at Room Temperature" in "GBT 31467.2-2015 Test Procedures for Battery Packs and Systems for High Energy Applications".

Measurement of the total full-discharge energy at −20° C. of the battery packs was conducted in accordance with "7.1.4 Capacity and Energy Test at Low Temperature" in "GBT 31467.2-2015 Test Procedures for Battery Packs and Systems for High Energy Applications". The composition and test results of the battery packs of Examples 1-19 and Comparative examples 1-4 are shown in Tables 2 to 4 below.

TABLE 2

| | Battery pack | | | | | | | | | |
|---|---|---|---|---|---|---|---|---|---|---|
| | First region | | | | | Second region | | | | |
| | First battery cell | | | | | Second battery cell | | | | |
| | | | Proportion A of discharge capacity of second discharge voltage plateau | | | | | Proportion B of discharge capacity of second discharge voltage plateau | | |
| | Types of first cathode active substance and cathode functional additive | Mass ratio of cathode functional additive to first cathode active substance | | Specific capacity of cathode active substance (mAh/g) | Discharge cutoff voltage at −20° C. (V) | Types of first cathode active substance and cathode functional additive | Mass ratio of cathode functional additive to first cathode active substance | | Specific capacity of cathode active substance (mAh/g) | Discharge cutoff voltage at −20° C. (V) |
| Example 1 | NCM + $TiNb_2O_7$ | 2:98 | 2.70% | 282.0 | 1.4 | NCM + $TiNb_2O_7$ | 6.5:93.5 | 8.62% | 286.5 | 1.2 |
| Example 2 | NCM + $TiO_2$ | 2:98 | 2.38% | 281.1 | 1.4 | NCM + $TiO_2$ | 6.5:93.5 | 7.68% | 283.6 | 1.2 |
| Example 3 | NCM + $Nb_2O_5$ | 2:98 | 1.44% | 278.4 | 1.4 | NCM + $Nb_2O_5$ | 6.5:93.5 | 4.73% | 274.8 | 1.2 |
| Example 4 | LFP + $TiNb_2O_7$ | 2:98 | 4.36% | 174.2 | 1.4 | LFP + $TiNb_2O_7$ | 6.5:93.5 | 13.45% | 183.7 | 1.2 |

TABLE 2-continued

| Example | Types | Mass ratio | Proportion | Capacity | Value | Types | Mass ratio | Proportion | Capacity | Value |
|---|---|---|---|---|---|---|---|---|---|---|
| Example 5 | LMO + TiNb$_2$O$_7$ | 2:98 | 4.98% | 152.6 | 1.4 | LMO + TiNb$_2$O$_7$ | 6.5:93.5 | 15.15% | 163.1 | 1.2 |
| Example 6 | NCM + Ti$_2$Nb$_2$O$_9$ | 2:98 | 2.92% | 282.6 | 1.4 | NCM + Ti$_2$Nb$_2$O$_9$ | 6.5:93.5 | 9.28% | 288.6 | 1.2 |
| Example 7 | NCM + Ti$_2$Nb$_{10}$O$_{29}$ | 2:98 | 2.51% | 281.5 | 1.4 | NCM + Ti$_2$Nb$_{10}$O$_{29}$ | 6.5:93.5 | 8.05% | 284.7 | 1.2 |
| Example 8 | NCM + TiNb$_{24}$O$_{62}$ | 2:98 | 2.38% | 281.1 | 1.4 | NCM + TiNb$_{24}$O$_{62}$ | 6.5:93.5 | 7.66% | 283.5 | 1.2 |
| Example 9 | LFP + Ti$_2$Nb$_2$O$_9$ | 2:98 | 4.71% | 174.8 | 1.4 | LFP + Ti$_2$Nb$_2$O$_9$ | 6.5:93.5 | 14.42% | 185.7 | 1.2 |
| Example 10 | LMO + Ti$_2$Nb$_{10}$O$_{29}$ | 2:98 | 4.64% | 152.1 | 1.4 | LMO + Ti$_2$Nb$_{10}$O$_{29}$ | 6.5:93.5 | 14.21% | 161.3 | 1.2 |
| Comparative example 1 | NCM | 0:100 | 0.00% | 280.0 | 1.4 | NCM | 0:100 | 0.00% | 280.0 | 1.2 |
| Comparative example 2 | NCM | 0:100 | 0.00% | 280.0 | 1.4 | LFP | 0:100 | 0.00% | 170.0 | 1.2 |
| Comparative example 3 | NCM + TiNb$_2$O$_7$ | 2:98 | 2.70% | 282.0 | 1.4 | NCM + TiNb$_2$O$_7$ | 2:98 | 2.70% | 282.0 | 1.2 |
| Comparative example 4 | NCM + TiNb$_2$O$_7$ | 11.5:88.5 | 14.99% | 291.5 | 1.4 | NCM + TiNb$_2$O$_7$ | 6.5:93.5 | 8.62% | 286.5 | 1.2 |

| | Third region Third battery cell | | | | | | |
|---|---|---|---|---|---|---|---|
| | Types of first cathode active substance and cathode functional additive | Mass ratio of cathode functional additive to first cathode active substance | Proportion C of discharge capacity of second discharge voltage plateau | Specific capacity of cathode active substance (mAh/g) | Discharge cutoff voltage at −20° C. (V) | Whether C > B > A | Battery pack performance Total energy retention rate at −20° C. |
| Example 1 | NCM + TiNb$_2$O$_7$ | 11.5:88.5 | 14.99% | 291.5 | 1.0 | Yes | 70.0% |
| Example 2 | NCM + TiO$_2$ | 11.5:88.5 | 13.45% | 286.3 | 1.0 | Yes | 69.0% |
| Example 3 | NCM + Nb$_2$O$_5$ | 11.5:88.5 | 8.49% | 270.8 | 1.0 | Yes | 65.8% |
| Example 4 | LFP + TiNb$_2$O$_7$ | 11.5:88.5 | 22.51% | 194.2 | 1.0 | Yes | 65.0% |
| Example 5 | LMO + TiNb$_2$O$_7$ | 11.5:88.5 | 25.02% | 174.7 | 1.0 | Yes | 76.7% |
| Example 6 | NCM + Ti$_2$Nb$_2$O$_9$ | 11.5:88.5 | 16.05% | 295.2 | 1.0 | Yes | 70.7% |
| Example 7 | NCM + Ti$_2$Nb$_{10}$O$_{29}$ | 11.5:88.5 | 14.06% | 288.3 | 1.0 | Yes | 69.4% |
| Example 8 | NCM + TiNb$_{24}$O$_{62}$ | 11.5:88.5 | 13.43% | 286.2 | 1.0 | Yes | 69.0% |
| Example 9 | LFP + Ti$_2$Nb$_2$O$_9$ | 11.5:88.5 | 23.95% | 197.8 | 1.0 | Yes | 66.0% |
| Example 10 | LMO + Ti$_2$Nb$_{10}$O$_{29}$ | 11.5:88.5 | 23.64% | 171.5 | 1.0 | Yes | 75.7% |
| Comparative example 1 | NCM | 0:100 | 0.00% | 280.0 | 1.0 | / | 60.5% |

TABLE 2-continued

|  | | Mass ratio | Proportion | | | | |
|---|---|---|---|---|---|---|---|
| Comparative example 2 | LMO | 0:100 | 0.00% | 148.0 | 1.0 | / | 56.7% |
| Comparative example 3 | NCM + TiNb$_2$O$_7$ | 2:98 | 2.70% | 282.0 | 1.0 | No | 62.9% |
| Comparative example 4 | NCM + TiNb$_2$O$_7$ | 2:98 | 2.70% | 282.0 | 1.0 | No | 60.7% |

It can be found from the results in Table 2 above that in Examples 1-10, the first battery cell, the second battery cell, and the third battery cell all had a first discharge voltage plateau and a second discharge voltage plateau, and, the proportion of the discharge capacity corresponding to the second discharge voltage plateau in the third battery cell>the proportion of the discharge capacity corresponding to the second discharge voltage plateau in the second battery cell>the proportion of the discharge capacity corresponding to the second discharge voltage plateau in the first battery cell, and the total energy retention rate of the battery pack at −20° C. reached 65.0%-76.7%.

In contrast, in both Comparative example 1 and Comparative example 2, the first battery cell, the second battery cell, and the third battery cell all had only one discharge voltage plateau, and the total energy retention of the battery pack at −20° C. was only 60.5% and 56.7%.

In Comparative example 3, although the first battery cell, the second battery cell, and the third battery cell all had a first discharge voltage plateau and a second discharge voltage plateau, however, the proportions of the discharge capacity corresponding to the second discharge voltage plateau in the first battery cell, the second battery cell, and the third battery cell were the same, and the total energy retention rate of the battery pack at −20° C. was only 62.9%.

In Comparative example 4, although the first battery cell, the second battery cell, and the third battery cell all had a first discharge voltage plateau and a second discharge voltage plateau, however, the proportion of the discharge capacity corresponding to the second discharge voltage plateau in the third battery cell<the proportion of the discharge capacity corresponding to the second discharge voltage plateau in the second battery cell<the proportion of the discharge capacity corresponding to the second discharge voltage plateau in the first battery cell, and the total energy retention rate of the battery pack at −20° C. was only 60.7%.

TABLE 3

Battery pack

| | First region — First battery cell | | | | | Second region — Second battery cell | | | | |
|---|---|---|---|---|---|---|---|---|---|---|
| | Types of first cathode active substance and cathode functional additive | Mass ratio of cathode functional additive to first cathode active substance | Proportion A of discharge capacity of second discharge voltage plateau | Specific capacity of cathode active substance (mAh/g) | Discharge cutoff voltage at −20° C. (V) | Types of first cathode active substance and cathode functional additive | Mass ratio of cathode functional additive to first cathode active substance | Proportion B of discharge capacity of second discharge voltage plateau | Specific capacity of cathode active substance (mAh/g) | Discharge cutoff voltage at −20° C. (V) |
| Example 1 | NCM + TiNb$_2$O$_7$ | 2:98 | 2.70% | 282.0 | 1.4 | NCM + TiNb$_2$O$_7$ | 6.5:93.5 | 8.62% | 286.5 | 1.2 |
| Example 11 | NCM | 0:100 | 0.00% | 280.0 | 1.4 | NCM + TiNb$_2$O$_7$ | 4:96 | 5.35% | 284.0 | 1.2 |
| Example 12 | NCM | 0:100 | 0.00% | 280.0 | 1.4 | NCM + TiNb$_2$O$_7$ | 4:96 | 5.35% | 284.0 | 1.2 |
| Example 13 | LFP | 0:100 | 0.00% | 170.0 | 1.4 | LFP + TiNb$_2$O$_7$ | 11.5:88.5 | 22.51% | 194.2 | 1.2 |
| Example 14 | LFP + TiNb$_2$O$_7$ | 4:96 | 8.52% | 178.4 | 1.4 | LMO + Ti$_2$Nb$_2$O$_9$ | 11.5:88.5 | 26.57% | 178.4 | 1.2 |
| Example 15 | NCM + TiNb$_2$O$_7$ | 11.5:88.5 | 14.99% | 291.5 | 1.4 | NCM + TiNb$_2$O$_7$ | 20:80 | 25.33% | 300.0 | 12 |

TABLE 3-continued

| | | Types of first cathode active substance and cathode functional additive | Mass ratio of cathode functional additive to first cathode active substance | Proportion C of discharge capacity of second discharge voltage plateau | Specific capacity of cathode active substance (mAh/g) | Discharge cutoff voltage at −20° C. (V) | Whether C > B > A | Battery pack performance Total energy retention rate at −20° C. |
|---|---|---|---|---|---|---|---|---|
| | | | | Third region Third battery cell | | | | |
| Example 1 | | NCM + $TiNb_2O_7$ | 11.5:88.5 | 14.99% | 291.5 | 1.0 | Yes | 70.0% |
| Example 11 | | NCM + $TiNb_2O_7$ | 11.5:88.5 | 14.99% | 291.5 | 1.0 | Yes | 68.6% |
| Example 12 | | NCM + $TiNb_2O_7$ | 23.5:76.5 | 29.42% | 303.5 | 1.0 | Yes | 67.5% |
| Example 13 | | LFP + $TiNb_2O_7$ | 23.5:76.5 | 40.71% | 219.4 | 1.0 | Yes | 64.1% |
| Example 14 | | LMO + $Ti_2Nb_2O_9$ | 23.5:76.5 | 46.10% | 210.0 | 1.0 | Yes | 65.2% |
| Example 15 | | NCM + $TiNb_2O_7$ | 23.5:76.5 | 29.42% | 303.5 | 1.0 | Yes | 59.3% |

It can be found from the results in Table 3 above that, in Examples 1, 11-14, the second battery cell and the third battery cell both had a first discharge voltage plateau and a second discharge voltage plateau, and the proportion of the discharge capacity corresponding to the second discharge voltage plateau in the third battery cell>the proportion of the discharge capacity corresponding to the second discharge voltage plateau in the second battery cell>the proportion of the discharge capacity corresponding to the second discharge voltage plateau in the first battery cell, additionally, the respective mass percentages of the cathode functional additive and the respective proportions of the discharge capacity corresponding to the second discharge voltage plateau in each of the first battery cell, second battery cell, and third battery cell were within the preferred ranges of the present application, and the total energy retention rate of the battery pack at −20° C. reached 64.1%-70.0%.

However, in Example 15, the respective mass percentages of cathode additive and/or the respective proportions of the discharge capacity corresponding to the second discharge voltage plateau in each of the first battery cell and the second battery cell were outside the preferred ranges of the present application, and the total energy retention rate of the battery pack at −20° C. was 59.3%.

TABLE 4

| | Battery pack | | | | | | | | | |
|---|---|---|---|---|---|---|---|---|---|---|
| | First region First battery cell | | | | | Second region | | | | |
| | | | | | | Second battery cell | | | | |
| | Types of first cathode active substance and cathode functional additive | Mass ratio of cathode functional additive to first cathode active substance | Proportion A of discharge capacity of second discharge voltage plateau | Specific capacity of cathode active substance (mAh/g) | Discharge cutoff voltage at −20° C. (V) | Types of first cathode active substance and cathode functional additive | Mass ratio of cathode functional additive to first cathode active substance | Proportion B of discharge capacity of second discharge voltage plateau | Specific capacity of cathode active substance (mAh/g) | Discharge cutoff voltage at −20° C. (V) |
| Example 1 | NCM + $TiNb_2O_7$ | 2:98 | 2.70% | 282 | 1.4 | NCM + $TiNb_2O_7$ | 6.5:93.5 | 8.62% | 286.5 | 1.2 |
| Example 16 | NCM + $TiNb_2O_7$ | 2:98 | 2.70% | 282 | 1.6 | NCM + $TiNb_2O_7$ | 6.5:93.5 | 8.62% | 286.5 | 1.6 |
| Example 17 | NCM + $TiNb_2O_7$ | 2:98 | 2.70% | 282 | 1.0 | NCM + $TiNb_2O_7$ | 6.5:93.5 | 8.62% | 286.5 | 1.0 |
| Example 18 | NCM + $TiNb_2O_7$ | 2:98 | 2.70% | 282 | 1.4 | NCM + $TiNb_2O_7$ | 6.5:93.5 | 8.62% | 286.5 | 1.6 |
| Example 19 | NCM + $TiNb_2O_7$ | 2:98 | 2.70% | 282 | 1.2 | NCM + $TiNb_2O_7$ | 6.5:93.5 | 8.62% | 286.5 | 1.4 |

TABLE 4-continued

|  | Types of first cathode active substance and cathode functional additive | Mass ratio of cathode functional additive to first cathode active substance | Third region Third battery cell |  |  |  |  |
|---|---|---|---|---|---|---|---|
|  |  |  | Proportion C of discharge capacity of second discharge voltage plateau | Specific capacity of cathode active substance (mAh/g) | Discharge cutoff voltage at −20° C. (V) | Whether C > B > A | Battery pack performance Total energy retention rate at −20° C. |
| Example 1 | NCM + TiNb$_2$O$_7$ | 11.5:88.5 | 14.99% | 291.5 | 1.0 | Yes | 70% |
| Example 16 | NCM + TiNb$_2$O$_7$ | 11.5:88.5 | 14.99% | 291.5 | 1.6 | Yes | 55% |
| Example 17 | NCM + TiNb$_2$O$_7$ | 11.5:88.5 | 14.99% | 291.5 | 1.0 | Yes | 71% |
| Example 18 | NCM + TiNb$_2$O$_7$ | 11.5:88.5 | 14.99% | 291.5 | 1.2 | Yes | 62% |
| Example 19 | NCM + TiNb$_2$O$_7$ | 11.5:88.5 | 14.99% | 291.5 | 1.6 | Yes | 58% |

It can be found from the results in Table 4 above that, in Example 1, the first battery cell, the second battery cell and the third battery cell all have a first discharge voltage plateau, and the proportion of the discharge capacity corresponding to the second discharge voltage plateau in the third battery cell>the proportion of the discharge capacity corresponding to the second discharge voltage plateau in the second battery cell>the proportion of the discharge capacity corresponding to the second discharge voltage plateau in the first battery cell, additionally, the discharge cut-off voltages of the first battery cell, the second battery cell, and the third battery cell at −20° C. were all within the preferred ranges in the present application, and the total energy retention rate of the battery pack at −20° C. reached 70%.

However, In Example 16, the discharge cut-off voltage of the second battery cell and the third battery cell at −20° C. was too high, and the total energy retention rate of the battery pack at −20° C. was 55%, which demonstrates that the cut-off voltage has a great influence on the total energy retention rate at −20° C.

In Example 17, the discharge cut-off voltage of the first battery cell and the second battery cell was too low, and although the total energy retention rate of the battery pack at −20° C. was 71%, the cut-off voltage being too low which improved the total energy retention rate at −20° C. was equivalent to an over-discharge, leading to the deterioration of the performance of the battery cell and generation of gases, which affected the life of the battery cell.

In Example 18, the discharge cut-off voltage of the second battery cell at −20° C. was too high and greater than the discharge cut-off voltage of the first battery cell, and the total energy retention of the battery pack at −20° C. was 62%.

In Example 19, the discharge cut-off voltage of the first battery cell at −20° C. was too low while the discharge cut-off voltage of the third battery cell at −20° C. was too high, and the discharge cut-off voltage of the third battery cell>the discharge cut-off voltage of the second battery cell>the discharge cut-off voltage of the first battery cell, and the total energy retention of the battery pack at −20° C. was 58%.

It should be noted that the present application is not limited to the above-mentioned embodiments. The above-mentioned embodiments are merely exemplary examples, and embodiments that have substantially the same configuration as the technical idea and exert the same effects within the scope of the technical proposals of the present application are included in the technical scope of the present application. In addition, without departing from the scope of the present application, various modifications added to the embodiments that are conceivable by those skilled in the art, and other forms constructed by combining some components in the embodiments are also included in the scope of the present application.

The invention claimed is:

1. A battery pack, comprising a battery pack container and battery cells accommodated in the battery pack container, wherein,
    an interior space of the battery pack container comprises a first region, a second region and a third region, first battery cells are arranged in the first region, second battery cells are arranged in the second region, third battery cells are arranged in the third region, the second battery cells are arranged surrounding the first battery cells, and the third battery cells are arranged surrounding the second battery cells, wherein,
    the first battery cells, the second battery cells and the third battery cells each has a first discharge voltage plateau and a second discharge voltage plateau, an average discharge voltage of the first discharge voltage plateau is higher than an average discharge voltage of the second discharge voltage plateau;
    the first battery cells, the second battery cells and the third battery cells each has a cathode active substance which is a mixture of a first cathode active substance having the first discharge voltage plateau and a cathode functional additive having the second discharge voltage plateau;
    the cathode functional additive is a titanium oxide, a niobium oxide or a titanium-niobium oxide; and
    in each of the first battery cells, the second battery cells and the third battery cells, when a sum of a discharge capacity corresponding to the first discharge voltage plateau and a discharge capacity corresponding to the second discharge voltage plateau is 100%, a proportion of the discharge capacity corresponding to the second discharge voltage plateau in the third battery cells>a proportion of the discharge capacity corresponding to the second discharge voltage plateau in the second battery cells>a proportion of the discharge capacity corresponding to the second discharge voltage plateau in the first battery cells.

2. The battery pack according to claim 1, wherein, the interior space of the battery pack container consists of the first region, the second region and the third region.

3. The battery pack according to claim 1, wherein, the cathode functional additive is a titanium niobium oxide represented by $Ti_2Nb_{2x}O_{4+5x}$, wherein x is an integer of 1 or higher.

4. The battery pack according to claim 1, wherein, the second discharge voltage plateau has a discharge voltage in a range of 1.0 V-2.0 V, optionally, a discharge capacity of the second discharge voltage plateau in a range of 1.2 V-1.6 V accounts for more than 50% of a total discharge capacity of the second discharge voltage plateau.

5. The battery pack according to claim 1, wherein, in the first battery cells, the second battery cells and the third battery cells, a difference between a lowest discharge voltage of the first discharge voltage plateau and a highest discharge voltage of the second discharge voltage plateau is 0.5 V or higher.

6. The battery pack according to claim 1, wherein, in the first battery cells, when the sum of the discharge capacity corresponding to the first discharge voltage plateau and the discharge capacity corresponding to the second discharge voltage plateau is 100%, the discharge capacity corresponding to the first discharge voltage plateau accounts for 90%-100%, and the discharge capacity corresponding to the second discharge voltage plateau accounts for 0%-10%.

7. The battery pack according to claim 1, wherein, in the second battery cells, when the sum of the discharge capacity corresponding to the first discharge voltage plateau and the discharge capacity corresponding to the second discharge voltage plateau is 100%, the discharge capacity corresponding to the first discharge voltage plateau accounts for 73%-95%, and the discharge capacity corresponding to the second discharge voltage plateau accounts for 5%-27%.

8. The battery pack according to claim 1, wherein, in the third battery cells, when the sum of the discharge capacity corresponding to the first discharge voltage plateau and the discharge capacity corresponding to the second discharge voltage plateau is 100%, the discharge capacity corresponding to the first discharge voltage plateau accounts for 54%-87%, and the discharge capacity corresponding to the second discharge voltage plateau accounts for 13%-46%.

9. The battery pack according to claim 1, wherein, the cathode active substance of the first battery cells has a specific capacity of 148 mAh/g-285 mAh/g, the cathode active substance of the second battery cells has a specific capacity of 155 mAh/g-295 mAh/g, and the cathode active substance of the third battery cells has a specific capacity of 169 mAh/g-311 mAh/g.

10. The battery pack according to claim 1, wherein, the cathode functional additive has a theoretical specific capacity of 350 mAh/g-410 mAh/g.

11. The battery pack according to claim 1, wherein, the first cathode active substance is one selected from lithium manganate, lithium nickelate, lithium cobaltate, lithium nickel cobalt manganate, lithium nickel cobalt aluminate, and lithium iron phosphate.

12. The battery pack according to claim 1, wherein, when the first battery cells, the second battery cells, and the third battery cells utilize a same type of the first cathode active substance and a same type of the cathode functional additive, respective mass percentages of the first cathode active substance in the cathode active substance decrease in an order of the first battery cells, the second battery cells, and the third battery cells, and respective mass percentages of the cathode functional additive in the cathode active substance increase in an order of the first battery cells, the second battery cells, and the third battery cells.

13. The battery pack according to claim 1, wherein, in the first battery cells, when a total mass of the first cathode active substance and the cathode functional additive is 100%, the first cathode active substance accounts for 96.0%-100% by mass and the cathode functional additive accounts for 0%-4.0% by mass.

14. The battery pack according to claim 1, wherein, in the second battery cells, when a total mass of the first cathode active substance and the cathode functional additive is 100%, the first cathode active substance accounts for 88.5%-96.0% by mass and the cathode functional additive accounts for 4.0%-11.5% by mass.

15. The battery pack according to claim 1, wherein, in the third battery cells, when a total mass of the first cathode active substance and the cathode functional additive is 100%, the first cathode active substance accounts for 76.5%-88.5% by mass and the cathode functional additive accounts for 11.5%-23.5% by mass.

16. The battery pack according to claim 1, wherein, the cathode functional additive is a carbon-coated lithium-containing titanium niobium oxide.

17. The battery pack according to claim 1, wherein, an anode of each of the first battery cells, the second battery cells and the third battery cells has been subjected to a lithium replenishment treatment.

18. The battery pack according to claim 1, wherein, at a temperature of 0° C. or lower, the first battery cells have a discharge cut-off voltage of 1.4 V-1.6 V, the second battery cells have a discharge cut-off voltage of 1.2 V-1.4 V, and the third battery cells have a discharge cut-off voltage of 1.0 V-1.2 V.

19. The battery pack according to claim 1, wherein, the number of the first battery cells:the number of the second battery cells:the number of the third battery cells=(3-8):(8-13):(10-15).

20. An electric device, comprising the battery pack according to claim 1.

* * * * *